United States Patent [19]

Krumes et al.

[11] Patent Number: 5,465,142

[45] Date of Patent: Nov. 7, 1995

[54] OBSTACLE AVOIDANCE SYSTEM FOR HELICOPTERS AND OTHER AIRCRAFT

[75] Inventors: Rolf Krumes, Anaheim; Dennis C. Richman, Irvine; Carl L. Bose, Rancho Palos Verdes, all of Calif.

[73] Assignee: Northrop Grumman Corporation, Los Angeles, Calif.

[21] Appl. No.: 56,220

[22] Filed: Apr. 30, 1993

[51] Int. Cl.[6] ............................. G01C 3/08; G01B 11/26; G08B 21/00; G02B 26/08
[52] U.S. Cl. ..................... 356/5.01; 340/946; 356/141.1; 359/201; 359/211
[58] Field of Search ........................... 356/5, 141, 141.1; 340/946; 359/201, 211

[56] References Cited

U.S. PATENT DOCUMENTS

| | | | |
|---|---|---|---|
| 3,334,956 | 8/1967 | Staunton | 350/162 |
| 3,713,147 | 1/1973 | Chanzit et al. | |
| 3,897,150 | 7/1975 | Bridges et al. | 356/5 |

(List continued on next page.)

FOREIGN PATENT DOCUMENTS

| | | |
|---|---|---|
| 2258637 | 8/1975 | France . |
| 60-254112A | 12/1985 | Japan . |
| 61-141418A | 6/1986 | Japan . |
| 1172919A | 7/1989 | Japan . |
| 3198020A | 8/1991 | Japan . |
| 1494561 | 12/1977 | United Kingdom . |
| 2185588A | 7/1987 | United Kingdom . |

OTHER PUBLICATIONS

Dallas N. Barr and Mark Savan. 19 Oct. 1988. "Laser Radar for Wire Detection (U)." *Laser Radar Team, Laser Division U.S. Army Center for Night Vision and Electro Optics*, Ft. Belvoir, VA 22060–5677.
Robert C. Harney. Aug. 25–26, 1981. "Physics and Technology of Coherent Infrared Radar." *The International Society for Optical Engineering*, vol. 300, The International Society for Optical Engineering, P.O. Box 10, Bellingham, Wash. 98227–0010.
"1.54 μm Solid–State Laser Radar for Helicopter Obstacle Avoidance System," H. Verdun, G. Stevenson, W. Koechner, Oct. 1992, published with the IRIA–IRIS Proceedings of the 1992 Meeting of the IRIS Specialty Group on Active Systems, vol. 1, By: Infrared Information Analysis Center, A DTIC–Sponsored DoD Information Analysis Center, Apr. 1993, pp. 427–444.

*Primary Examiner*—Stephen C. Buczinski
*Attorney, Agent, or Firm*—Terry J. Anderson; Karl J. Hoch, Jr.

[57] ABSTRACT

A system for sensing objects in the flight path of an aircraft and alerting the pilot to their presence includes a laser radar subsystem for emitting a beam of laser energy, receiving returns from objects, and processing the returns to produce range data related to the range of the objects from the aircraft. A scanning subsystem scans the beam and produces directional information related to the instantaneous direction of the beam relative to the aircraft. Processor circuitry controls operation, processes the range data and directional information with instrumentation data from the avionics system, produces video information related to the range, direction, and type of the objects, and interfaces the video information to the video display system. The processor circuitry may be programmed to (1) overlay video information on existing aircraft video display system, (2) provide acoustical warnings on an aircraft intercom, (3) analyze returns by subdividing the field of regard into a series of analysis windows, performing a statistical analysis of the returns related to each of the analysis windows, and identifying returns that fall into a common range interval, (4) transforming coordinates of objects measured relative to the aircraft to a horizon-stabilized, north-oriented coordinate system which is independent of the attitude of the aircraft, (5) inserting the coordinates of identified objects into a data base so that the coordinates may be used for constructing a video display at a later time and updating the data base to correct for movements of the aircraft, and (6) constructing a window-of-safety display of objects currently within the field of regard by adjusting the displayed position of the objects to compensate for avoidance maneuvers the pilot may execute.

31 Claims, 15 Drawing Sheets

U.S. PATENT DOCUMENTS

| | | | |
|---|---|---|---|
| 4,277,170 | 7/1981 | Miles | 356/152 |
| 4,466,068 | 8/1984 | Degre et al. | 364/461 |
| 4,497,065 | 1/1985 | Tisdale et al. | 382/1 |
| 4,533,918 | 8/1985 | Virnot | 343/451 |
| 4,562,769 | 1/1986 | Heynau et al. | 89/41.06 |
| 4,572,662 | 2/1986 | Silverman | 356/5 |
| 4,646,244 | 2/1987 | Bateman et al. | 364/461 |
| 4,647,761 | 3/1987 | Cojan et al. | 250/203 |
| 4,703,820 | 11/1987 | Reinaud | 180/169 |
| 4,716,444 | 12/1987 | Mongeon et al. | 356/5 |
| 4,737,788 | 4/1988 | Kennedy | 342/29 |
| 4,748,569 | 5/1988 | Gordon | 364/462 |
| 4,755,818 | 7/1988 | Conrad | 340/961 |
| 4,830,443 | 5/1989 | Hecker et al. | 350/3.71 |
| 4,834,531 | 5/1989 | Ward | 356/5 |
| 4,862,373 | 8/1989 | Meng | 364/444 |
| 4,895,419 | 1/1990 | Doyle et al. | 350/3.69 |
| 4,902,126 | 2/1990 | Koechner | 356/5 |
| 4,916,445 | 4/1990 | Crossley | 340/946 |
| 4,948,258 | 8/1990 | Caimi | 356/376 |
| 4,970,653 | 11/1990 | Kenue | 364/461 |
| 5,028,129 | 7/1991 | Smith | 356/4 |
| 5,046,794 | 9/1991 | Ritter et al. | 359/18 |
| 5,086,396 | 2/1992 | Waruszewski | 364/454 |
| 5,119,231 | 6/1992 | Nelson et al. | 359/359 |
| 5,121,124 | 6/1992 | Spivey et al. | 342/179 |
| 5,210,586 | 5/1993 | Grage et al. | 356/5 |
| 5,255,065 | 10/1993 | Schwemmer | 356/5 |

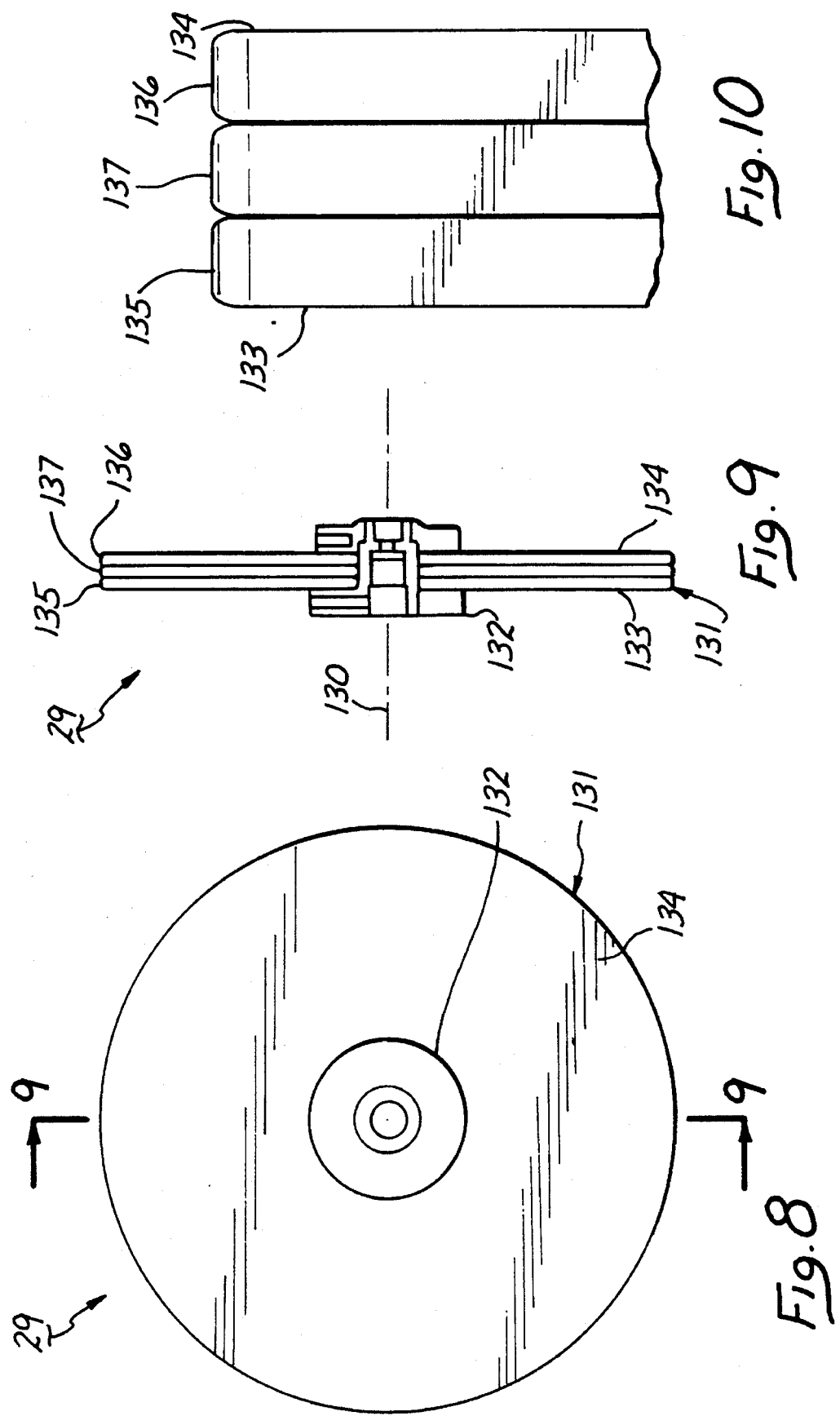

OBSTACLE AVOIDANCE SYSTEM FOR HELICOPTERS AND OTHER AIRCRAFT

BACKGROUND OF THE INVENTION

1. Technical Field

This invention relates generally to avionic sensor systems. Many aspects relate to an onboard system suitable for detecting obstacles and alerting the pilot during low-altitude, nighttime, helicopter operations.

2. Background Information

Low-altitude, nighttime, helicopter operations provide great advantages in many battlefield settings, but they also greatly increase the risk of collision with wires, cables, towers, antennae, trees, and terrain features. To augment pilot vision, the helicopter commonly includes imaging devices such as forward-looking infrared scanners (FLIRs) and image intensifiers (night-vision goggles). However, resolution often proves inadequate at normal flight speeds for timely detection of wires, steel towers, and other thin objects. That limitation can significantly impair operations and force reduced speed during transitional flight in which the pilot flies to a target at altitudes below 50 feet and during nap-of-the-earth flight in which the pilot flies as low as possible to avoid detection. Daytime operations also have obstacle-related problems. Thus, helicopter operations need a better way to detect obstacles.

Some prior attempts at wire detection employ radio waves in the millimeter wave band or light from carbon dioxide ($CO_2$) lasers at 10.6 micrometers, Nd:Yag lasers at 1.06 micrometers, and various laser diodes at 0.85 micrometer. But none have led to the development of a small, compact, lightweight, cost effective obstacle avoidance system for aircraft. Such a system should also feature eye-safe operation for overflown personnel as well as aircraft ground crews, provide an effective pilot interface, and install conveniently in existing aircraft. Furthermore, it should operate at day or night and under inclement weather conditions, and it should not impair aircraft survivability.

SUMMARY OF THE INVENTION

This invention solves the problems and meets the criteria outlined above by providing an onboard obstacle-detecting and pilot-warning system referred to as an Obstacle Avoidance System (OASYS). It combines a laser radar (ladar) subsystem with a scanning subsystem and processor circuitry to produce a data bank of obstacle-related data. The scanning subsystem combines circular and azimuthal scanning to cover a field of regard (FOR) while the processor circuitry controls operation, processes range data and directional information (i.e., orientation information) using aircraft instrumentation data in order to produce the obstacle-related data and prepare it for display on display systems of the host aircraft using a window-of-safety concept subsequently described.

The system is small, compact, lightweight, and cost effective. It features eye-safe operation and provides an effective pilot interface. It operates at day or night and under inclement weather conditions, and it does not impair aircraft survivability.

In terms of the claim language subsequently developed, a system constructed according to the invention includes a ladar subsystem for emitting a beam of laser energy, receiving returns from objects, and processing the returns to produce range data related to the range of the objects from the aircraft. The ladar subsystem is mounted on an aircraft having an avionic system and a display system, such as a video display. The avionic system produces instrumentation data concerning the attitude and velocity vectors of the aircraft, and the video display system displays information to a pilot of the aircraft.

The system also includes a scanning subsystem for scanning the beam relative to the aircraft and producing directional information related to the instantaneous direction of the beam relative to the aircraft. Processor circuitry controls operation of the ladar subsystem and the scanning subsystem, processes the range data, directional information, and instrumentation data, produces video information related to the range and direction of the objects, and interfaces the video information to the video display system.

According to one aspect of the invention, the scanning subsystem scans the beam in a circular scan pattern centered on a first scan axis while moving the first scan over a field of regard—either moving the first axis back and forth in azimuth relative to the aircraft about a second scan axis or in a circular pattern. That technique covers the field of regard effectively using a circular scanner with a limited field of view (FOV). One version uses a lightweight holographic optical element (HOE) to direct the beam off axis although other optical wedges may be employed.

According to another aspect of the invention, the processor circuitry is programmed to perform one or more inventive functions. It may be programmed to (1) overlay obstacle-related video information on other video information displayed by the display system, (2) provide acoustical warnings on an aircraft intercom, (3) detect the closest object in a given direction by filtering range data based on spatial density, (4) transform data into a horizon stabilized coordinate system so that data is independent of aircraft rotations, store object data in a data base for subsequent reuse, adjust stored object data to compensate for aircraft linear motion, (5) provide a window-of-safety display with symbology showing pilot-safe passage adjusted to compensate for current aircraft motion, and (6) adjust the scanner directional information to compensate for aircraft motion.

In line with the above, a method of sensing and displaying objects in the flight path of an aircraft (the word "in" meaning in or nearby to) includes the step of providing means in the form of a ladar subsystem mounted on an aircraft for emitting a beam of laser energy, receiving returns from objects, and processing the returns to produce range data related to the range of the objects. The method proceeds by scanning the beam in a circular scan pattern centered on a first scan axis, moving the circular scan pattern back and forth in azimuth relative to the aircraft, and producing directional information related to the instantaneous direction of the beam. As that occurs, the method includes processing the range data and the directional information, producing video information related to the range data and the directional information, and interfacing the video information to a video display system on the aircraft. The step of processing may proceed according to the algorithms identified above.

The foregoing and other objects, features, and advantages of the invention become more apparent upon reading the following detailed description with reference to the illustrative drawings.

BRIEF DESCRIPTION OF THE DRAWINGS

FIG. 8 is a front view of a holographic optical element used to produce the circular scan pattern;

FIG. 9 is a cross sectional view of the holographic optical element taken on line 9—9 of FIG. 8;

FIG. 10 is an enlarged portion of FIG. 9 showing further details of the holographic optical element;

DESCRIPTION OF A PREFERRED EMBODIMENT

Figure 1:
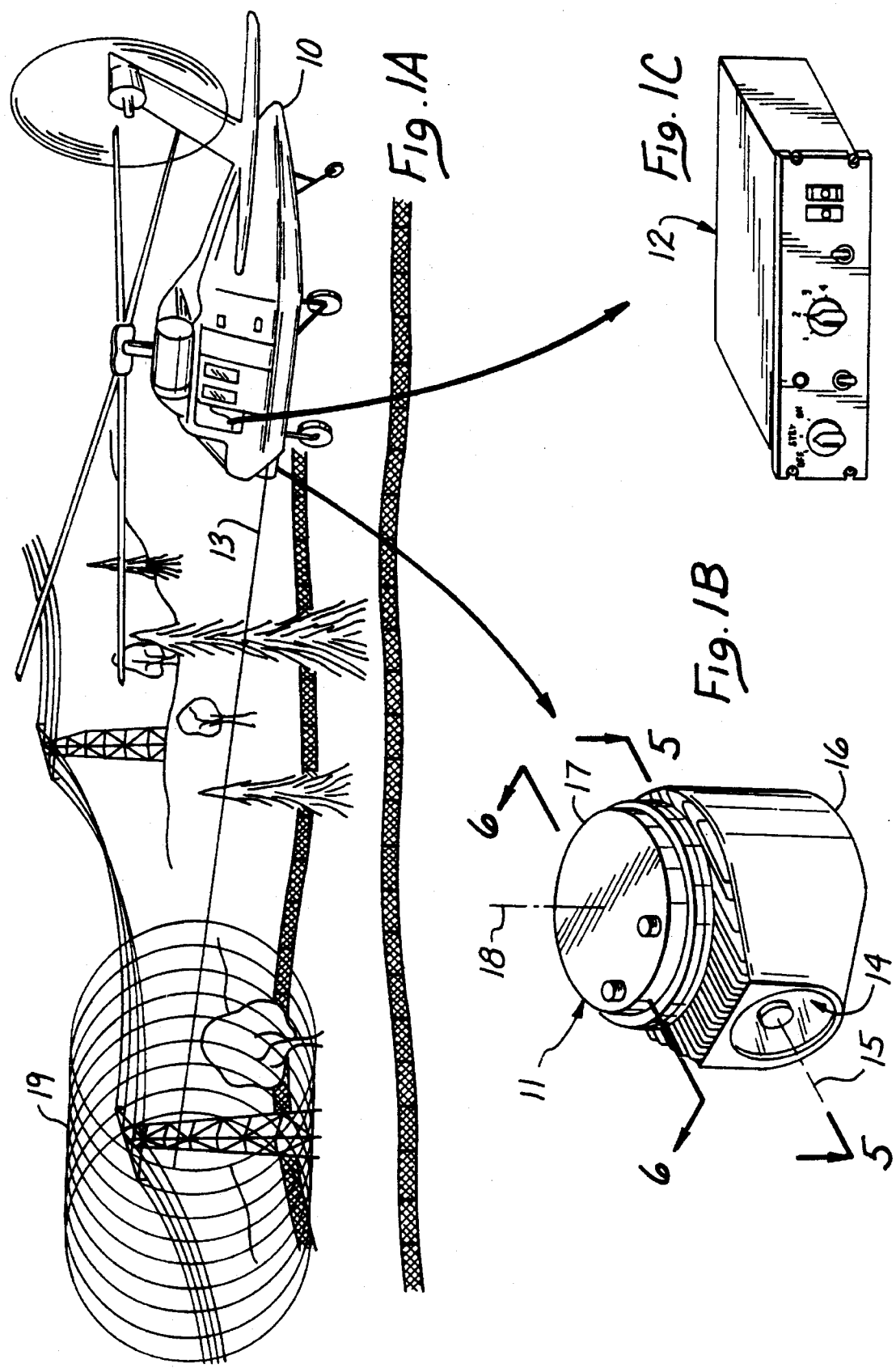
FIGS. 1a, 1b, and 1c form a pictorial representation of a helicopter outfitted with an obstacle avoidance system constructed according to the invention.

Overview. FIG. 1 pictorially illustrates a helicopter 10 outfitted with an obstacle avoidance system (OASYS) constructed according to the invention. The OASYS includes a turret assembly 11 and a control panel 12. They install onboard the helicopter 10 where they integrate with existing power, avionics, video (or other display), and intercom systems to provide in-flight warnings and guidance commands to the pilot concerning wires, towers, antennae, trees, terrain features, and other upcoming obstacles.

The turret assembly 11 mounts on an interface turret (or other suitable structure) under the nose of the helicopter 10. There, it provides a platform structure for laser radar (ladar) equipment and associated scanning and processing components. The control panel 12 mounts in a pilot-accessible position within the helicopter 10 where it enables the pilot to set operational modes and otherwise control operation.

In operation, the turret assembly 11 emits a beam 13 of laser energy through a forward-looking window 14. As that occurs, a disc-shaped HOE on the turret assembly 11 scans the beam 13 circularly about a first scan axis 15 which may be generally aligned with the longitudinal (roll) axis of the aircraft. In addition, an azimuth scanner on the turret assembly 11 moves a lower portion 16 of the turret assembly 11 relative to an upper portion 17 in order to scan the beam 13 in azimuth about a second scan axis 18 which may be generally parallel to the vertical (yaw) axis of the aircraft.

Doing so produces a circular scan pattern in a plane perpendicular to the first scan axis 15 as depicted at reference numeral 19 in FIG. 1. The circular scan results in left and fight elevational scans while the azimuthal scan moves the circular scan over the entire field indicated in FIG. 2. In other words, the first scan axis 15 moves in azimuth between two points A and B in FIG. 2 as the beam 13 scans a circularly shaped path about it. That combined action covers the field of regard within the boundary C.

Figure 2:
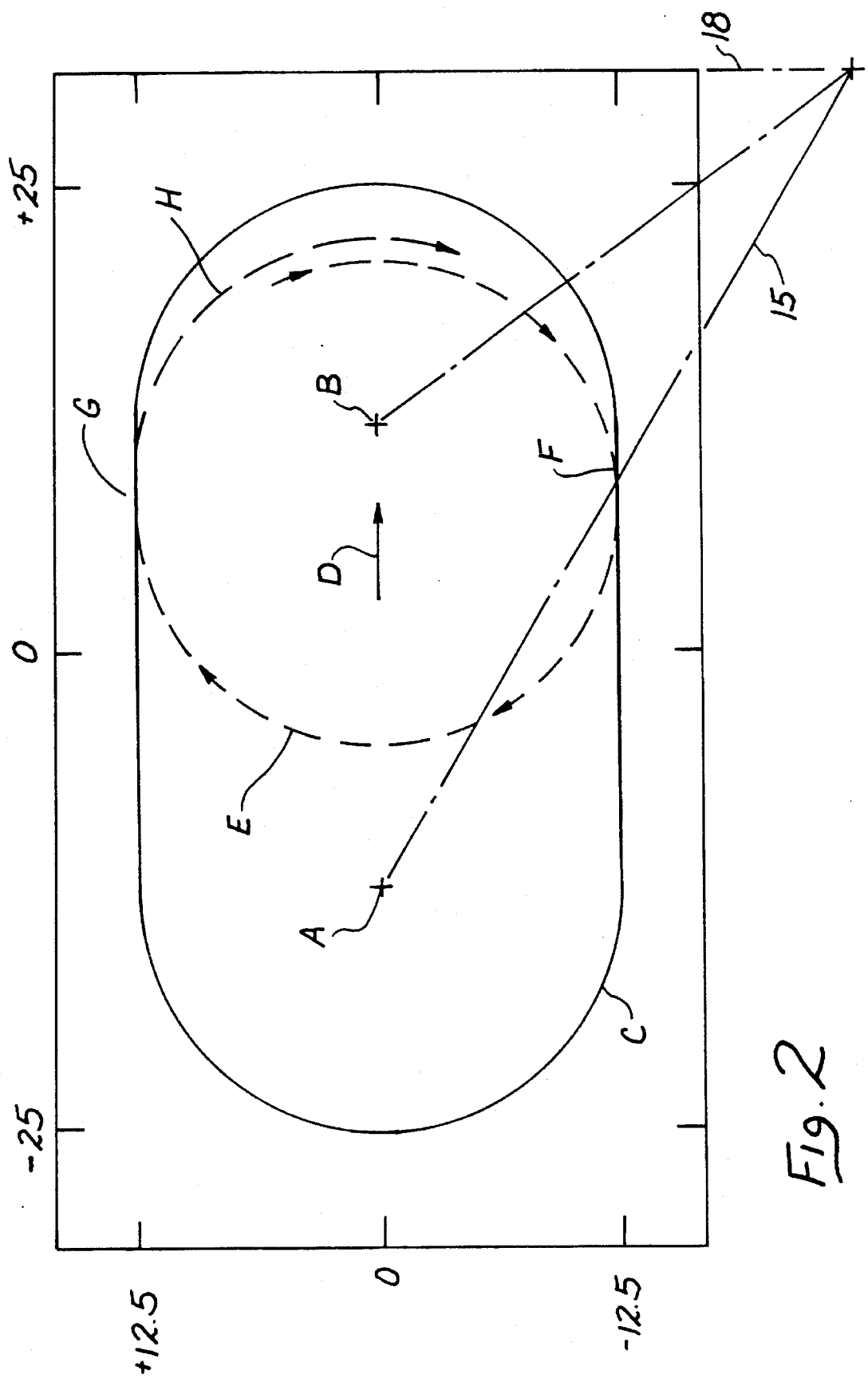
FIG. 2 is an enlarged representation of the field covered by the combined circular and azimuthal scan pattern.

As the first scan axis 15 moves at a relatively slow rate between points A and B as depicted by an arrow D in FIG. 2, the beam 13 scans clockwise from the viewpoint of the pilot in a circular pattern at a faster rate as depicted by the dashed line. That results in a left elevational scan E (from the viewpoint of the pilot) as the beam 13 scans along a semicircularly shaped path between the bottom F of the scan and the top G of the scan, and a fight elevational scan H as the beam 13 scans along a semicircularly shaped path between the top G and the bottom F.

Figure 3:
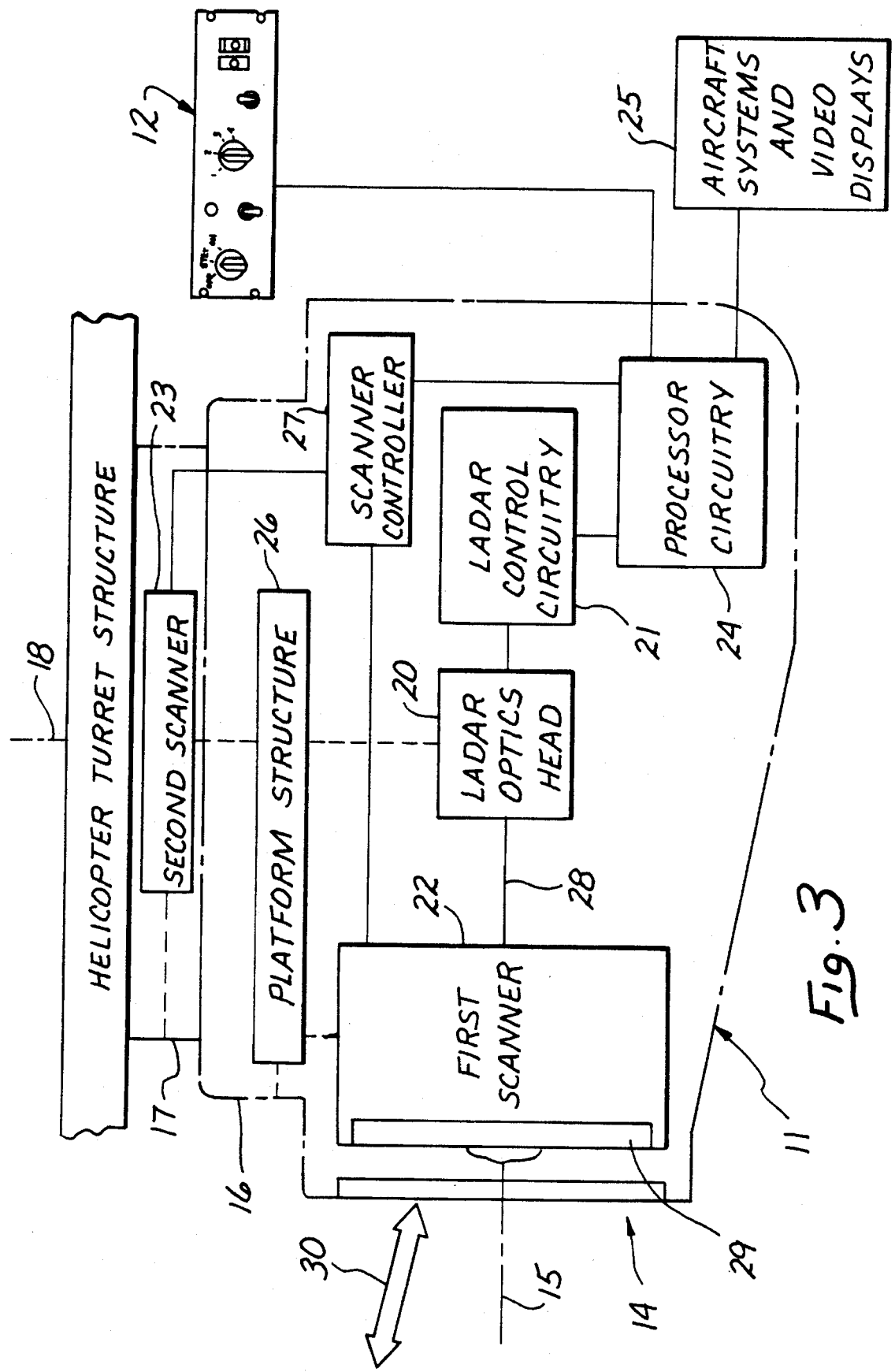
FIG. 3 is a pictorial block diagram of the system showing an overview of various components on the turret assembly and the interconnection to aircraft systems.

FIG. 3 is an enlarged diagrammatic representation of the turret assembly 11 installed in the helicopter 10. Connected to aircraft power, video, intercom, and avionics systems (all of which are depicted in FIG. 3 by a block 25), the turret assembly 11 operates by providing obstacle-related display (i.e., object-related video) and related audio information (i.e., acoustical warnings) according to operational modes the pilots sets with the control panel 12. The video is either displayed to the pilot in the form of a window of safety or combined with existing aircraft video to enhance existing video displays. The audio data is directed to the aircraft intercom system.

To accomplish those functions, the turret assembly 11 includes a ladar optics head 20, associated ladar control circuitry 21, a circular or first scanner 22, an azimuth or second scanner 23, and processor circuitry 24. The ladar optics head 20 serves as means for emitting a beam of laser energy and receiving returns from objects. The first scanner 22 and the second scanner 23 combine to serve as a scanning subsystem for scanning the beam over a predetermined field of regard. The ladar control circuitry 21, pulses the beam of laser energy and synchronizes the first and second scanners 22 and 23. It includes a processor that produces range data related to the range of the objects based upon the returns.

The processor circuitry 24 processes the range data and the directional information along with instrumentation data from an existing aircraft avionics system to produce a data bank of obstacle-related data. It then overlays the obstacle-related data on other video data displayed by the aircraft video systems. For those purposes, the processor circuitry 24 is operatively connected to the ladar control circuitry 21, to the control panel 12, and to aircraft power, video, intercom, and avionic systems depicted by the block 25.

The turret assembly 11 includes a platform structure 26 that serves as a support structure for supporting the ladar optics head 20 and the first scanner 22. The physical connections are depicted diagrammatically in FIG. 3 by dashed lines. Physical connections from the platform structure 26 to the ladar control circuitry 21 and to the processor circuitry 24 are not shown because the ladar control circuitry 21 and the processor circuitry 24 may be mounted elsewhere on the aircraft. Only the ladar optics head 20 portion of the ladar need be physically connected to the platform structure 26. The ladar optics head 20 has four major subassemblies: a transmitter, a receiver, a beamsplitter, and an expander telescope. They must be fixed relative to the platform structure 26.

The platform structure 26 also physically connects to the lower portion 16 of the turret assembly 11. That way, the window 14 in the lower portion 16 remains aligned with the first scan axis 15 as the platform structure 26 pivots about the second scan axis 18. In addition, the platform structure 26 physically connects to the second scanner 23 which, in turn, physically connects to the upper portion 17 of the turret assembly 11 and, thereby, to the helicopter turret drum structure.

The second scanner 23 scans the beam in azimuth by pivoting the platform structure 26 relative to the upper portion 17 (and the helicopter turret structure) about the second scan axis 18. That action pivots the ladar optics head 20, the first scanner 22, and the window 14 in the lower portion 16 of the assembly 11. As a result, the first scan axis 15 moves back and forth in azimuth between the points A and B in FIG. 2 while the beam scans in a circle centered on the first scan axis 15. Of course, one of ordinary skill in the art may construct a turret assembly in any of various physical forms to perform the scanning functions described. So, the mechanical layout of the illustrated turret assembly 11 is not given in precise detail.

In operation, the ladar optics head 20 emits an outgoing beam of laser energy and receives returns on axis relative to the first scan axis 15 as depicted by a double-headed arrow 30 in FIG. 3. The first scanner 22, which occupies a position between the ladar optics head 20 and the window 14, directs the beam off axis to produce a circular scan pattern centered on the first scan axis 15. The illustrated first scanner 22 accomplishes its function with a scanning element in the form of a disc-shaped HOE 29 that combines multiple holograms to diffract the outgoing beam and receive the returns somewhat off the first scan axis 15 as depicted by the double-headed arrow 30 (e.g., at an angle of 12.5 degrees). The first scanner 22 includes components that spin the HOE 29 about the first scan axis 15 under control of a scanner controller 27 at a fixed rotational rate (e.g., at 110 Hz). That results in a circular scan pattern that extends 12.5 degrees in elevation above and below the first scan axis 15. The 110 Hz rotational rate is sufficiently slow in comparison to the speed of light so that returning energy (i.e., the returns) returns along essentially the same path as the outgoing beam, but in reverse direction.

Meanwhile, the second scanner 23 scans the beam in azimuth by pivoting the ladar optics head 20, the first scanner 22, and the window 14 back and forth about the second scan axis 18 so that the circular scan pattern moves back and forth in azimuth relative to the aircraft. The second scanner 23 does that by pivoting the platform structure 26 and all components mounted on said structure back and forth about the second scan axis 18 (e.g. 12.5 degrees either side of a center position) with an essentially constant angular rate, except when reversing the direction of movement. The combined circular and azimuthal scanning results in the scan pattern depicted at reference numeral 19 in FIG. 1 and it covers the field of regard shown within the boundary C in FIG. 2.

As scanning continues, the ladar control circuitry 21 processes returns in a known manner to produce range data over the entire field of regard. In addition, the scanner controller enables the processor circuitry 24 to keep track of the instantaneous direction of the beam relative to the aircraft (i.e., the first and second scan axes 15 and 18). The processor circuitry 24 processes the range data, directional information about the instantaneous direction of the beam, and instrumentation data to produce video and acoustical information, and it communicates that information to the pilot using the aircraft video display and intercom systems.

Of course, other display and intercom systems may be used without departing from some of the inventive concepts disclosed. The illustrated OASYS, however, overlays video information on the Pilot Night Vision System (PNVS) head-tracked Forward Looking Infra Red (FLIR) imagery as well as overlaying it on the existing Head-Mounted Display (HMD) of the Integrated Helmet And Display Sighting System (IHADSS). For that purpose, the illustrated processor circuitry 24 includes multiple processors that are programmed to control the turret assembly 11 and fully integrate the OASYS system with existing aircraft systems.

As an idea of size, the overall height of the illustrated turret assembly 11 is a little less than 35 cm. The depth perpendicular to the plane of the window 14 (along the first scan axis 15) is a little less than 50 cm, and the width is a little less than 40 cm. Of course, those dimensions may vary significantly without departing from the inventive scanning and processing concepts disclosed and component placement may vary from that illustrated.

Figure 4:
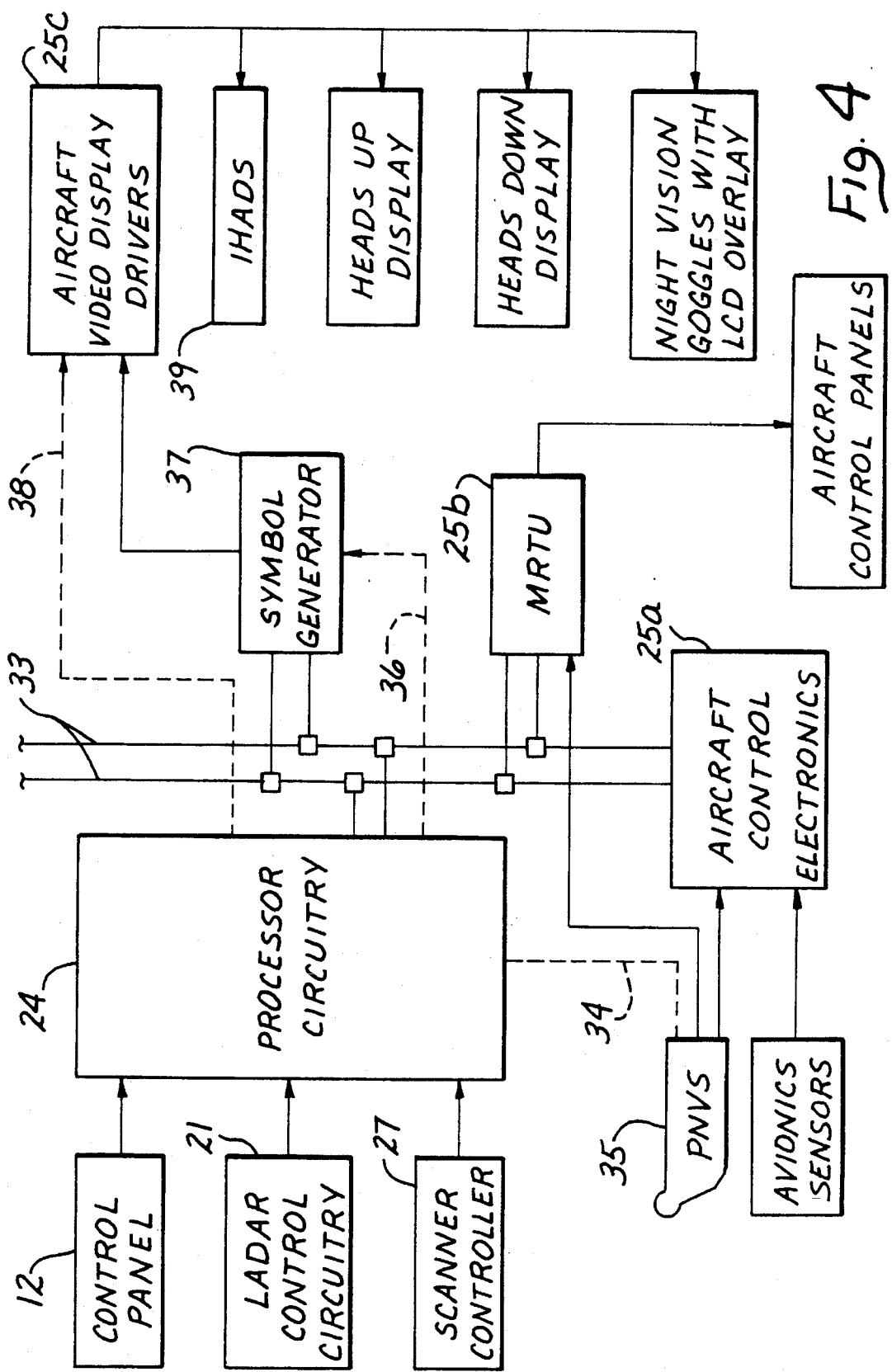
FIG. 4 is a block diagram showing further details of the OASYS installed on an aircraft.

FIG. 4 is a block diagram showing further details of an OASYS installed on a helicopter. The dashed lines depict new RS343 video paths to and from the processor circuitry 24 to show the overall concept of combining obstacle-related video information produced by the OASYS with other video information produced by existing aircraft video systems. Of course, one of ordinary skill in the art may vary the precise details of mechanical and electrical installation to accommodate the particular aircraft on which the OASYS is installed.

The processor circuitry 24 interfaces directly with the MIL-STD-1553B bus structure identified in FIG. 4 by reference numeral 33. Data such as attitude, altitude, heading, line-of-sight (LOS) data, velocity data, control mode functions, and Fault Detection/Location System (FDLS) data are available from the 1553B bus for OASYS coordinate transformation and moding control. The control panel 12, ladar control circuitry 21, and the scanner controller 27 input information to the processor circuitry 24 as discussed above. A line 34 couples the output from a Pilot Night Vision Sensor (PNVS) 35 to the processor circuitry 24. A line 36 couples a first enhanced video signal (VIDEO #1) from the processor circuitry 24 to an existing symbol generator 37, and a line 38 couples a second enhanced video signal (VIDEO #2) to an existing IHADSS 39 (Integrated Helmet and Display Sight System) via a driver 25c. So connected, the OASYS combines its obstacle-related video information with the PNVS 35 output to produce the VIDEO #1 and VIDEO #2 signals, and it supplies those enhanced signals to the existing aircraft video systems for display on one or more of the IHADSS, heads up display, heads down display, and night vision goggles with an LCD overlay.

From the preceding overview, one of ordinary skill in the art can practice many aspects of the invention. The following description provides additional details about system hardware and software, including OASYS installation in a conventional aircraft, a multi-processor form of processing circuitry, and various inventive processing and display algorithms.

Figure 5:
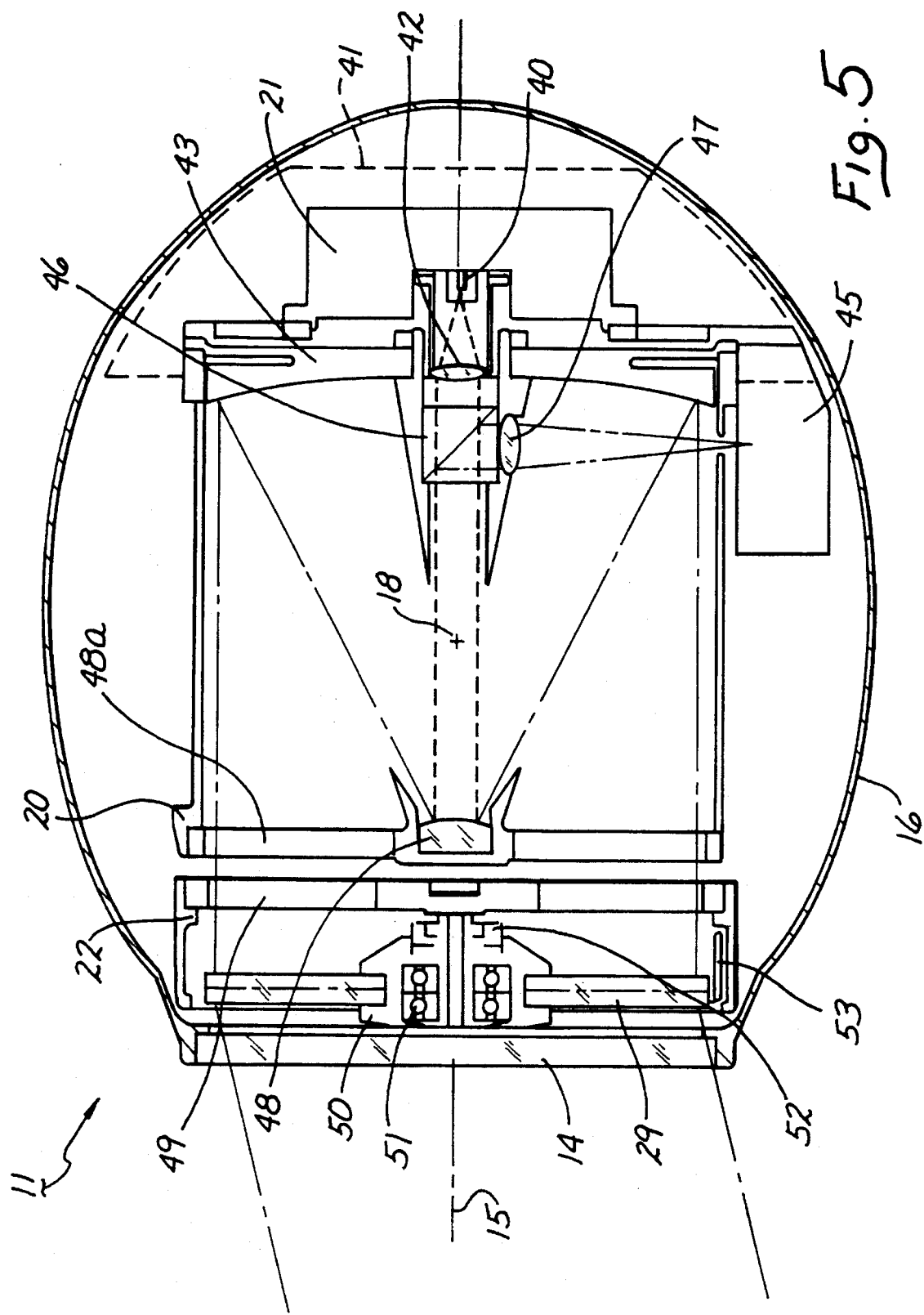
FIG. 5 is a sectional view of the turret assembly taken on line 5—5 of FIG. 1b.

Turret Assembly. FIG. 5 is a sectional view of the turret assembly 11 taken in a horizontal plane through the first scan axis 15. It expands upon the block diagram in FIG. 3 and shows the physical placement of the ladar optics head 20, consisting of the telescope structure with attached components, the first scanner assembly 22 with the HOE 29, and the turret cover 16 with the window 14. These three components are mounted on the platform structure 26 which is located in the plane of FIG. 5 but above the level of the cross section.

The Ladar Optics Head. The ladar optics head 20 has four major subassemblies: a transmitter, a receiver, a beamsplitter, and an expander telescope. The transmitter forms a single electro-optical assembly and it includes a laser diode array 40, a pulsed power supply 41, and a multielement collimating lens 42. The laser diode array 40 and the collimator lens 42 attach to a pulser which mounts behind a primary mirror 43 and receives a trigger signal from ladar control circuitry 21 each time the transmitter is pulsed. A suitable high-peak-current (in excess of 90A), high-repetition-rate (in excess of 100 kHz) pulser is available, for example, from Power Technologies Inc. of Mabelvale, Alaska.

High peak output power is achieved by stacking two or more high-power GaAlAs pulsed laser diode arrays into a single package as the laser diode array 40. Each of the laser diodes within the package is capable of emitting peak pulsed optical output power of 60 W. The two diode arrays are driven by the pulser unit. The driver can provide the required peak currents (90 A maximum) with pulse lengths up to 70 ns and up to 100 kHz pulse repetition frequency (PRF).

The laser diode array 40 may, for example, take the form of an assembly that uses two laser diode junctions having one millimeter diode apertures (available from Spectra Diode Labs, Inc. of San Jose, Calif.). Each of the two laser diode junctions are mounted to a thermally efficient submount-heatsink. Each heatsink is sufficiently thick to provide unrestricted heat flow, thereby maximizing heat removal, minimizing the junction temperature rise during pulsed operation and maximizing operating life and reliability.

The two laser junctions are configured back to back, yielding an active region separation of 0.009 inch (225 micrometer). The pulsed laser diodes may be low divergence, Separate-Confinement-Heterojunction (SCH) "W" structures that have demonstrated the capability of providing very high peak pulse powers and very high average powers. This same structure is used for a wide variety of high-power continuous-wave laser diodes being sold commercially.

The collimator lens 42 collimates light from the diode laser array 40 to a beam divergence of about 10 milliradians (mrad) and a diameter of 18 millimeters (mm). An f/0.6 lens with a 30 mm effective focal length and a 18.5 mm clear aperture collects and collimates the laser output. The 500 micrometer long laser facets of the laser diode array 40 act as extended sources, so the light emitted from the collimator lens 42 will diverge about 16.7 mrad in one axis and somewhat less than that in the other axis. When this small-diameter beam (18.5 mm) expands in the telescope by 11x, the beam divergence at the large aperture OASYS output is reduced by the magnification factor to 1.5 mrad. Collimator lens technology for laser diode arrays has matured significantly, and a series of low f-number, wide-field-of-view collimators is available from Spectra Optics Corp., of Little Falls, N.J.

A receiver 45 receives the focused light that exits from the side of a polarizing beamsplitter 46 (FIG. 4). The receiver 45 employs known components and design techniques which are not described in detail. It has a pinhole entrance aperture that defines a 2.0 mrad instantaneous field of view (IFOV). That design prevents stray light from entering the receiver 45. The expanding light exits from the pinhole and is collected by a collimating lens followed by a narrowband optical filter. The received signal is then focused via a simple lens onto the photocathode of a detector in the receiver 45.

The beamsplitter 46 and a focusing lens 47 are located in the shadow of a secondary telescope mirror 48 which is held by spider mounts 48a in the opening of the telescope structure in front of the primary mirror 43. The beamsplitter 46 separates outgoing vertically polarized laser radiation from incoming horizontally polarized receiver radiation. The lens 47 focuses the received light into the entrance aperture of the receiver 45. Commercially available components may be used.

The primary and secondary mirrors 43 and 48 form a simple Cassegrain telescope that expands the transmitter and receiver beams by 11x. Two aluminum spherical mirrors are used. The primary mirror 43 is 6 inches (20.3 centimeter) in diameter and operates at about f/1.1. The secondary mirror 48 is 1.5 inch (3.81 cm) in diameter and it recollimates the highly converging rays from the primary mirror 43.

Ladar Control and Interface. The control and interface circuitry 21 for the ladar unit provides trigger signals for the laser power supply 41 and processes the signals received by the avalanche photo diode receiver 45 to extract range information for use by the processor circuitry 24. The processing functions performed are typical for most radar or ladar systems and are shown, somewhat simplified, in FIG. 16 which depicts the major building blocks.

A pulse generator 70 receives sync signals from the processor circuitry 24 which indicate that the circular scanner is in the top or bottom position of the scan circle. The pulse generator 70 uses these sync signals to generate a stream of trigger pulses with a pulse rate frequency that is modulated in such a way that the vertical resolution of the circular scanner is constant even though the elevation increment varies with the sine of the angle that the rotating disk travels from the top or bottom position. The output of the pulse generator 70 triggers the laser power supply 41 which sends a power pulse to the laser diode 40 whenever it receives a trigger pulse.

A small fraction of the pulsed light generated by the laser is reflected back by objects in its path and is received by the avalanche photo diode 45 which converts it into a corresponding electrical signal. The time of arrival relative to the time at which the laser pulse was transmitted depends on the distance the light has traveled. For every 300 meters total travel distance, corresponding of a range of 150 meters to the reflecting object, the delay amounts to one microsecond.

Figure 16:
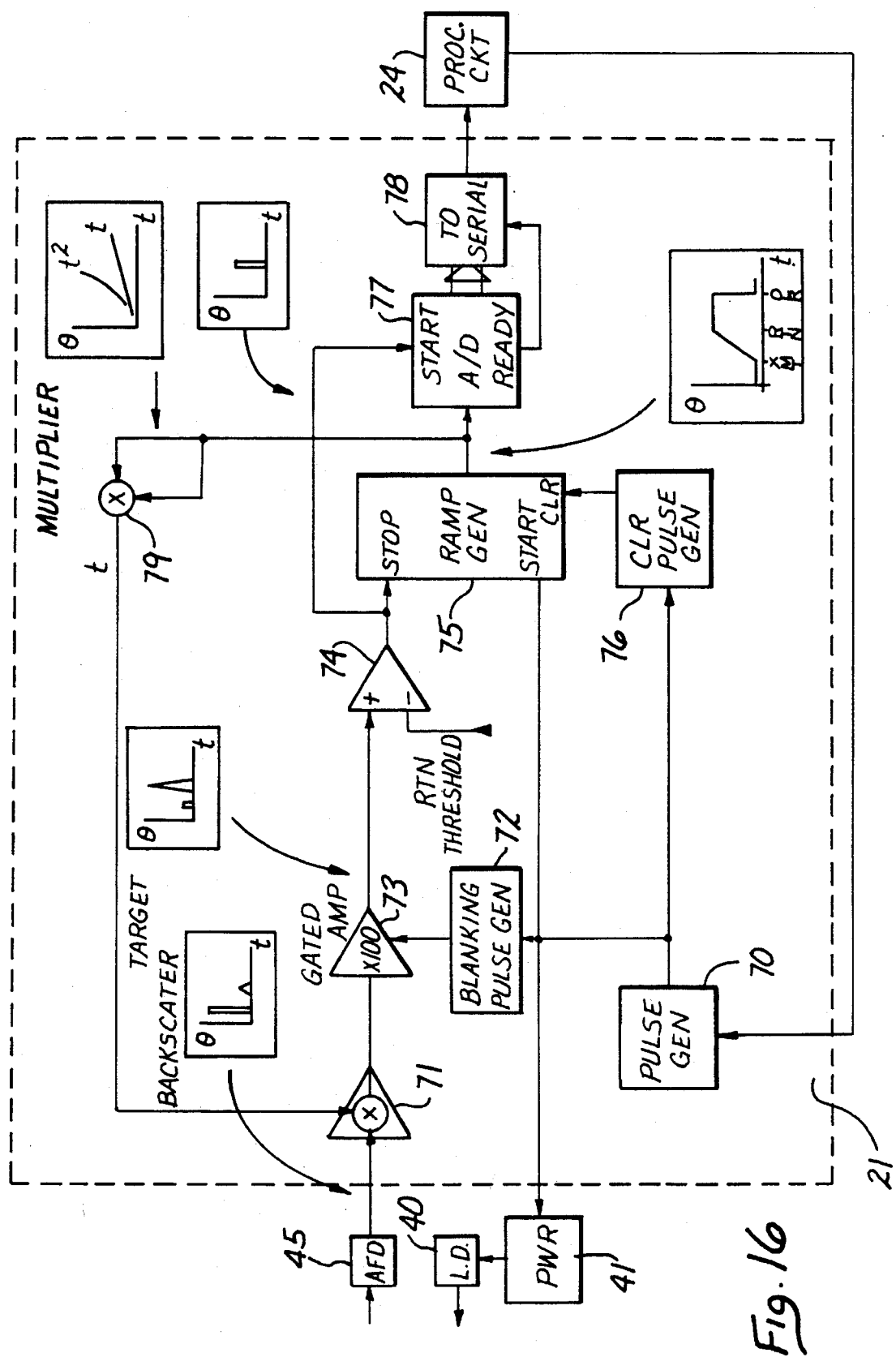
FIG. 16 is a block diagram showing various aspects of the control and interface circuitry.

The amplitude of the received light signal also depends on the distance traveled and the well-known radar range equation postulates that the power of the received signal decreases proportional to the inverse of the square of the range. Radar and ladar systems normally contain means to compensate for this amplitude decrease. The ladar control and interface unit, for this purpose, includes a ramp generator 75 which is started by the trigger pulse, a multiplier 79 which receives the output of the ramp generator and a multiplying amplifier 71 whose gain is controlled by the output of the multiplier 79 and which increases proportional to this control signal. The input signal from the avalanche photo diode 45, as depicted in FIG. 16, also contains a large signal artifact which occurs shortly after the laser pulse has been transmitted and which represents the backscatter from the surfaces of the ladar optics head. To prevent saturation by this artifact the amplifier 73 is gated from the blanking pulse generator 72, also started by the trigger pulse, and is not gated on until after the backscatter artifact has passed.

The output of the gated amplifier connects to a voltage comparator 74 where it is compared with a threshold voltage. If the return signal exceeds this threshold the output of voltage comparator 74 stops ramp generator 75 and starts the analog-digital (A/D) converter 77. The output voltage of ramp generator 75 and the corresponding digital signal from A/D converter 77 correspond to the time lapsed since the laser pulse was transmitted and, hence, to the range to the object which reflected it. The A/D converter, once the conversion has been completed, triggers a parallel-to-serial converter 78 which sends the digital range data to the processor circuitry 24 over a serial interface cable.

Circular HOE Scanner. FIG. 5 also shows the mounting and assembly of the first or circular scanner 22. This scanner consists of the HOE disk 29 which is potted into a stainless steel hub 50 and rotates on duplex turbine-type bearings 51, driven by a brush-less DC motor 52. These components are centered in the scanner housing by spider mounts 49. An optical sensor 53, also mounted on this housing, provides information to the scanner controller when the HOE scanning element 29 is in the position where the laser beam reaches the top or bottom position on the scan circle. This sensor can, for example, be a reflective optical sensor consisting of a LED and a photo-transistor which sense the passing of a marker or markers on the circumference of the rotating HOE. Any other one of a number of commercially available position sensor types may be used for this purpose.

Figure 6:
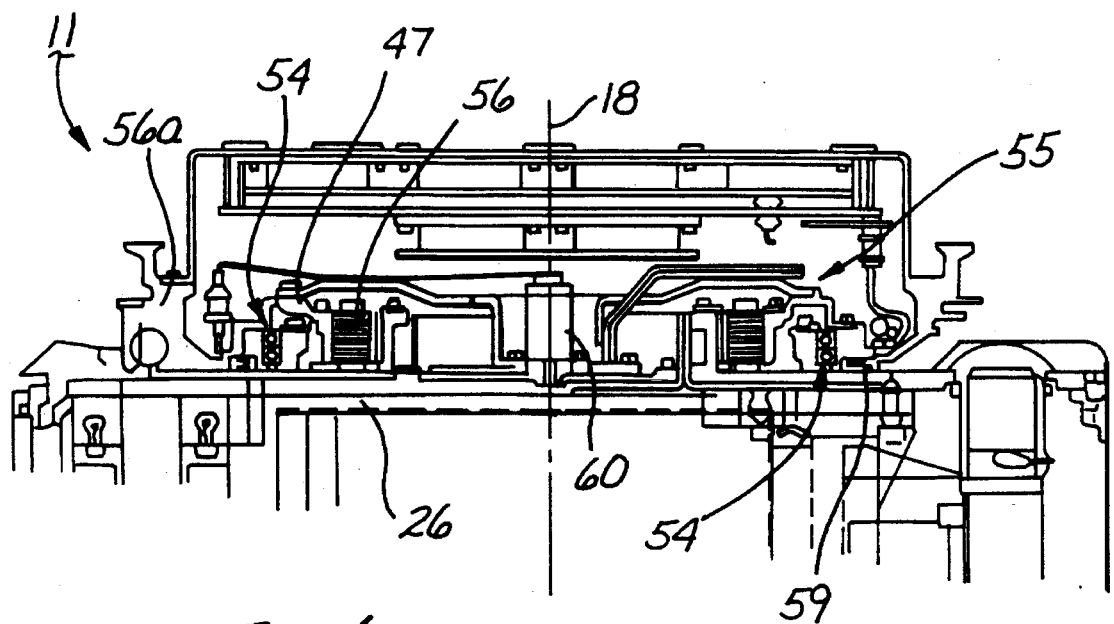
FIG. 6 is a sectional view of a portion of the turret assembly taken on line 6—6 of FIG. 1b.
Figure 7:
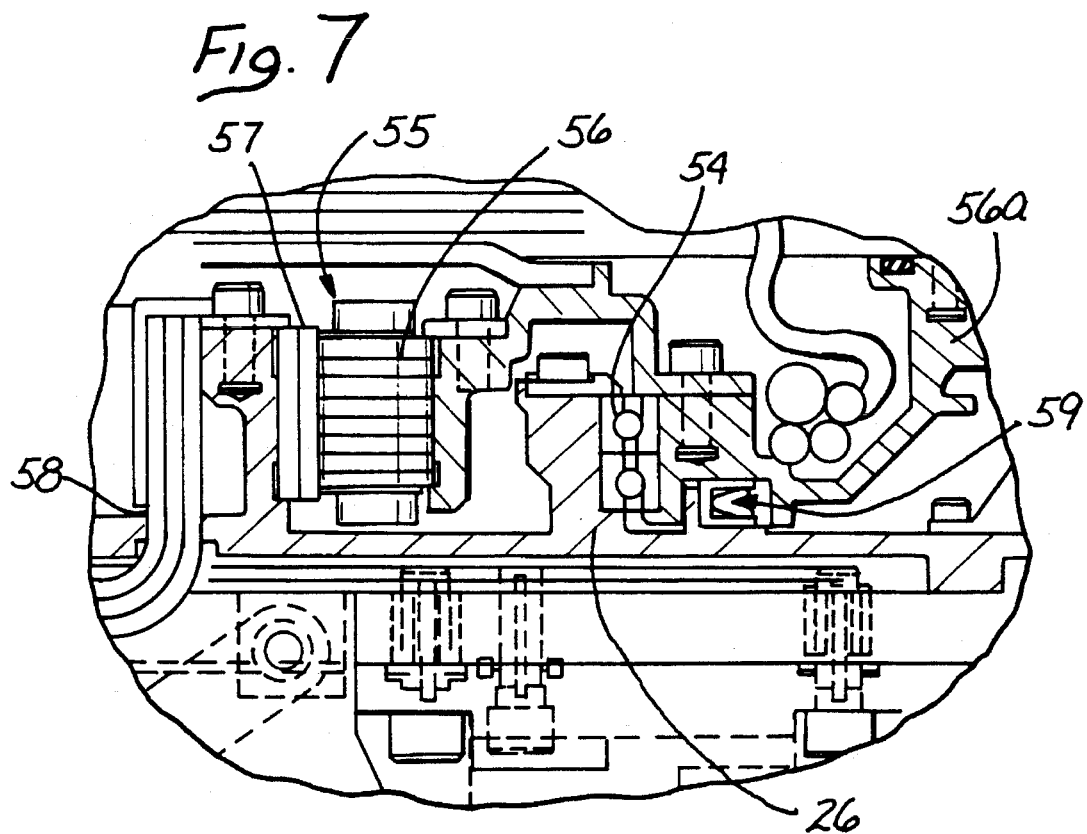
FIG. 7 is an enlarged view of a portion of FIG. 6.

Azimuth Scanner. Details of the second or azimuth scanner 23 are shown in FIGS. 6 and 7. The platform structure 26 is mounted in the helicopter turret structure by means of a large diameter duplex ball bearing 54. It can be made to rotate around axis 18 in an oscillating motion by means of a large diameter torque motor 55. The motor consists of a stationary armature 56 which carries the excitation windings and which is mounted on the helicopter turret structure and a rotor 47 with powerful permanent magnets which is mounted on the turret platform structure 26.

A flexible environmental seal 59 is located outside and surrounding the bearing 54 and keeps the interior of the turret assembly free of dust and contamination while permitting the oscillating scanning motion. Insulated electrical wires are shaped into a ribbon and provide connections to the components mounted on said platform structure during said oscillating motion around axis 18. A sensor device 60 is mounted on the turret structure 56a concentric with axis 18 and provides positional information on the rotation of the platform structure 26 around said axis. Sensor device 60 may be a synchro or selsyn type angle encoder or any one of a number of angle encoder devices of other types available from many commercial vendors.

Scanner Controller. Scanner controller 27 is mounted on the platform structure 26 of the turret and connects to the first scanner 22, the second scanner 23, the processor circuitry 27 as well as to conventional power supplies not shown in the drawings. The scanner controller is made up of conventional electronic circuitry which has the function of providing controlled drive signals for the motors in the first and second scanner and also of providing interfaces between the sensors in said scanners and the processor circuitry.

The electronic circuitry for controlling the first scanner consists of a conventional servo system which senses the rotational speed from the signals obtained from sensor 53 and which adjusts the drive voltage for the DC motor 52 accordingly in order to keep the rotational speed within close limits of a desired value, e.g. 110 rotations per second. The circuitry also amplifies the signals from sensor 53 for use as a synchronization signal by the control circuit for the second scanner and by the processor circuitry. The circuitry also generates a fail-safe signal which disables the Laser firing if the rotational speed of the HOE scanner drops below a given value.

The electronic circuitry for controlling the second scanner consists of a three phase power amplifier which uses current mode pulse-width modulation to provide drive signals for the torque motor 55 and a rate servo system which senses the azimuth rate of the turret from the signals obtained from sensor 60 and provides control signals to the amplifier to effect a constant azimuth rate within a certain scan angle, e.g. +/− 12.5 degrees from a center position. Digital/Analog (D/A) converters receive various digital signals from the processor circuitry 24 and convert them into corresponding analog voltages for use by the rate servo system. These voltages determine the center position of the scan, the angle relative to the center position for the right-most position of the scan, the azimuth rate for scanning in the direction of the right-most position, the left-most position of the scan and the azimuth scan rate for scanning in the direction of the left-most position.

When the angular position of the turret reaches the left or right outermost scan position as defined by the corresponding analog voltages, the rate servo system causes the movement of the scanner to reverse at a constant rate of angular acceleration thus resulting in an oscillating periodic motion whose angular rate is essentially constant with the exception of the brief time intervals during which the direction of the scan reverses. The circuitry further contains elements which send a digital representation of the instantaneous angular position of the turret, derived from the sensor 60, to the processor circuitry 24 every time the synchronization signal received from the sensor 53 indicates that the laser beam is in the top or bottom position of the scan circle.

Holographic Optical Element. Now consider the HOE 29 in further detail with reference to FIGS. 8–13. It is a 6.25-inch (15.9 cm) diameter, disc-shaped structure having rotational symmetry with respect to a rotational axis 130 (FIG. 9). It includes a three-layer composite substrate structure 131 potted into a stainless steel hub 132 that is used to mount the HOE 29 on a shaft of the first scanner 22 in the turret assembly 11 (FIG. 3). When so mounted, the rotational axis 130 aligns with the first scan axis 15. A small offset from perfect alignment may avoid any back reflection noise to the receiver in the ladar optics head 20 (FIG. 3) Alternatively, range gating circuitry may be incorporated into the ladar control circuitry 21 (FIG. 3) to avoid back reflectance noise to the receiver.

In operation, the outgoing beam 13 (FIG. 1) passes first through a rearward surface 133 of the HOE 29, then through holograms and filter elements, and finally out a forward surface 134. As it does so, it passes through a first hologram on a first substrate 135, a second hologram on a third substrate 136, and a filter element on a second substrate 137 (FIGS. 9 and 10). The holograms redirect the beam as desired. The filter element suppresses any zero-order leakage from the first hologram.

Any of various suitable substrate materials may be used, but in the illustrated HOE 29 each of the substrates 135–137 is a one-eighth inch (3.175 mm) thick, disc-shaped piece of glass (e.g., borasilicate BK7 glass). The holograms and the filter element are formed on the glass substrates, and then the three substrates are bonded together by suitable means, such as optical cement, for example, or other means known in the art of optical systems, to form a composite stack structure (i.e., the composite substrate structure 131). The first hologram is positioned on the inside surface of the first substrate 135. The second hologram is positioned on the inside surface of the third substrate 136. The filter is position on that surface of second substrate 137 which faces the first substrate. A properly sealed sandwich (known in the art of optical cementing of glass and optical cement) provides environmental protection to the humidity-sensitive holograms and filter elements.

Figure 11:
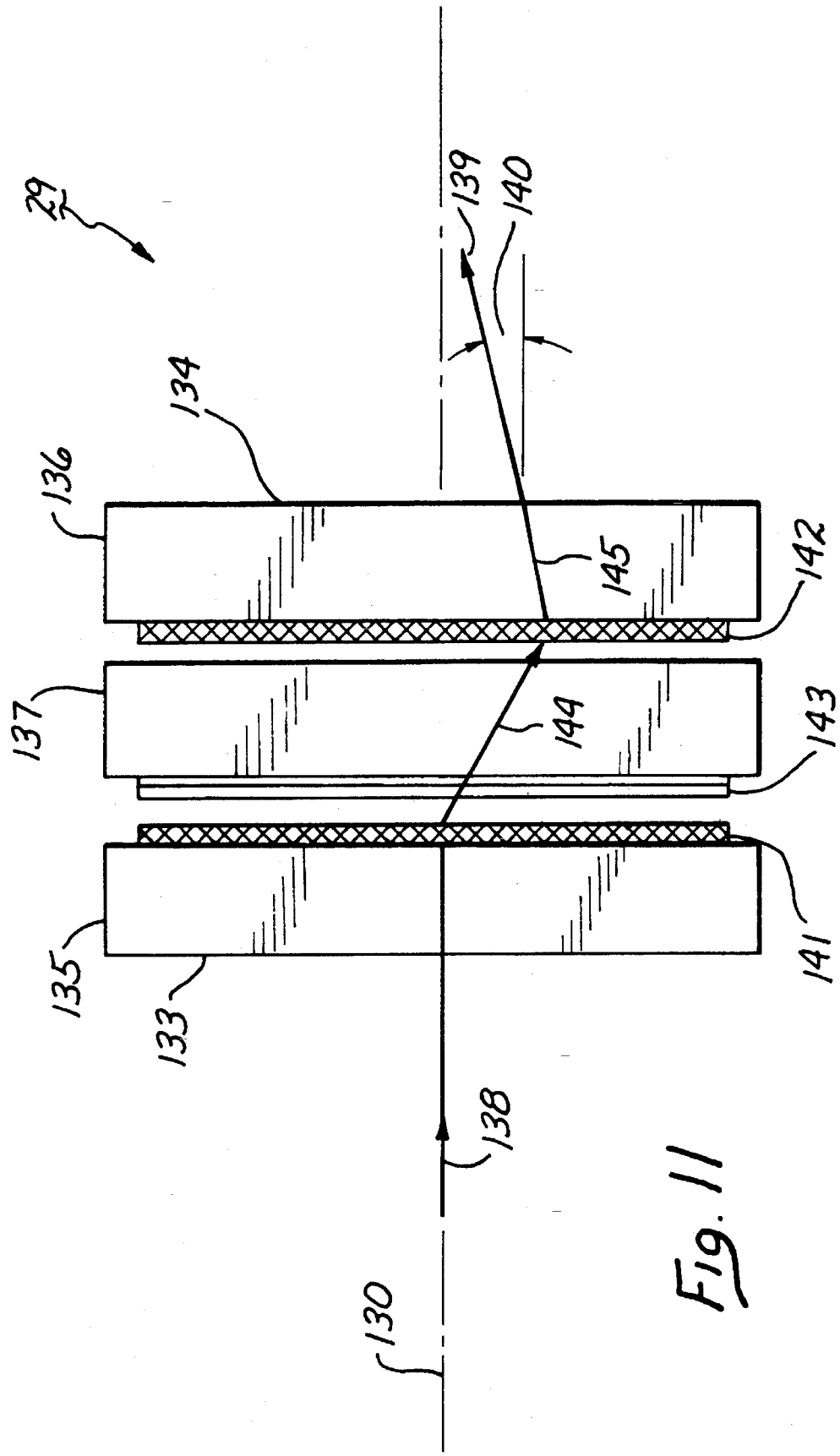
FIG. 11 is a diagrammatic representation of the holographic optical element showing the first and second holograms and the thin-film interference filter exaggerated in thickness for illustrative convenience.

The holograms may be fabricated using known techniques. They may be about 10 microns thick and the filter element may be about 5 microns thick. So, FIG. 11 illustrates the holograms and filter element diagrammatically with greatly exaggerated thickness for illustrative convenience.

A normally incident, on-axis incoming beam (depicted in FIG. 11 at reference numeral 138) passes through the rearward surface 133 and exits from the forward surface 134 as an off-axis outgoing beam (depicted at reference numeral 139) that is redirected to an angle 140 (e.g., 12.5 degrees). Enroute, the beam passes through a first hologram 141 on the first substrate 135 (an input hologram), a second hologram 142 on the second substrate 136 (an output hologram), and a filter element 143 on the third substrate 137. The first hologram 141 diffracts the beam by a first acute angle (e.g., 45 degrees) and in a first radial direction from the rotational axis to a first redirected path depicted at reference numeral 144. The second hologram 142 diffracts the beam 144 by a different second acute angle (e.g., 53.186 degrees) and in an opposite second radial direction from the rotational axis to a second redirected path as depicted at reference numeral 145. The air boundary at the forward surface 134 refracts the beam 145 an additional small amount (e.g., 4.314 degrees) according to Snell's Law to the final off-axis angle 140 (e.g., 12.5 degrees).

Figure 12:
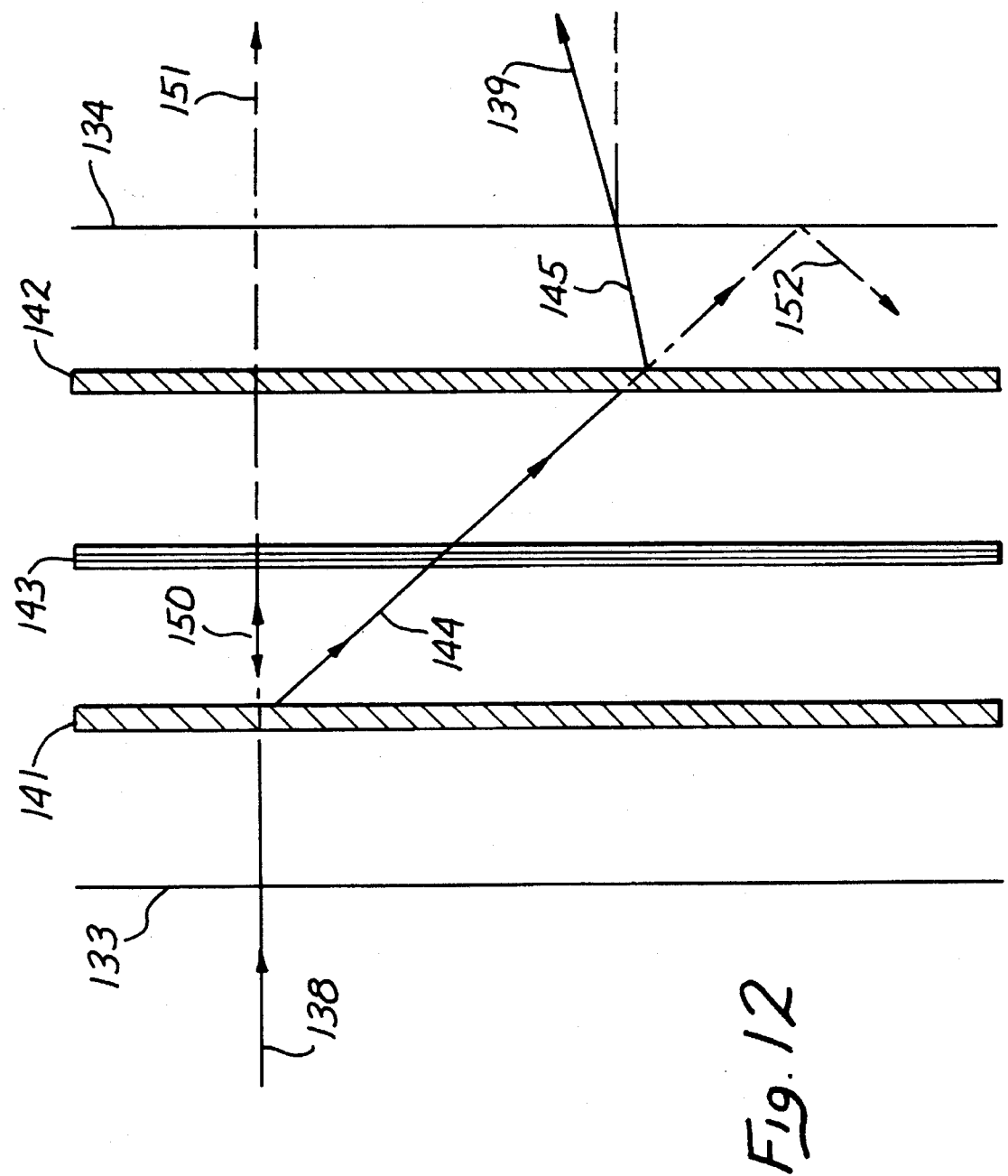
FIG. 12 is a propagation diagram for the holographic optical element showing total internal reflection.

FIG. 12 is a schematic diagram of the HOE 29. It achieves total internal reflection of any zero-order leakage through the second hologram 142. Any internal angle greater than the critical angle (e.g., about 41.14 degrees relative to the normal inside a 1.52 index medium) will be totally internally reflected. For example, in FIG. 12 the first hologram is imprinted so that it diffracts the beam 138 by a 45 degree internal angle as depicted at 144. The second hologram is imprinted so that it diffracts the beam by a 53.186 degree angle in the opposite direction as depicted at 145. The air boundary at the forward surface 134 refracts the beam by 4.314 degrees as depicted at 139 so that the outgoing beam is directed at an off-axis angle of 12.5 degrees.

In theory, a hologram can be 100 percent efficient for a single polarization. This 100 percent efficiency not only may be difficult to achieve in practice, but also may be undesirable for design specifications. For example, it may be desirable (as is the case in the illustrated embodiments) to have a polarization-insensitive hologram. That requires tuning the efficiencies of both holograms to an equal amount less than 100 percent for each of two orthogonal polarizations. For example, in FIG. 12 some energy striking the first hologram 141 passes through unrefracted. Suppression of the undeviated (zero-order) beam is accomplished with a thin-film interference filter sandwiched between the two holograms. Any of several filter design alternatives may be used. It is intended that the filter element 143 serve to illustrate any such filter elements.

Preferably, a computer-optimized, wide-band, long-wavelength-pass reflector stack is sandwiched within the HOE 29. The design and production of such a reflector stack is not necessarily unique and can be generated by one or ordinary skill in the art and technology of thin-film dielectric interference filters. The reflector stack reflects the zero-order beam (as depicted at 150) while passing the first and higher order beams beyond an angle of about 42 degrees. It does so over a fairly broad tolerance in bandwidth (e.g., about 850±25 nm) at normal incidence while transmitting most of the first-order beam at 45 degrees, effectively independent of polarization. Residual zero-order leakage (depicted at 151) is orders of magnitude less. Total internal reflection of zero-order leakage through the second hologram 142 occurs at the forward surface 134 as depicted at 152. That zero-order leakage dissipates internally (e.g., at the inner and outer diameter of the HOE disk). Alternatively, the filter element 143 may take the form of a reflectance or transmission hologram without departing from the broader inventive concepts disclosed.

Figure 13:
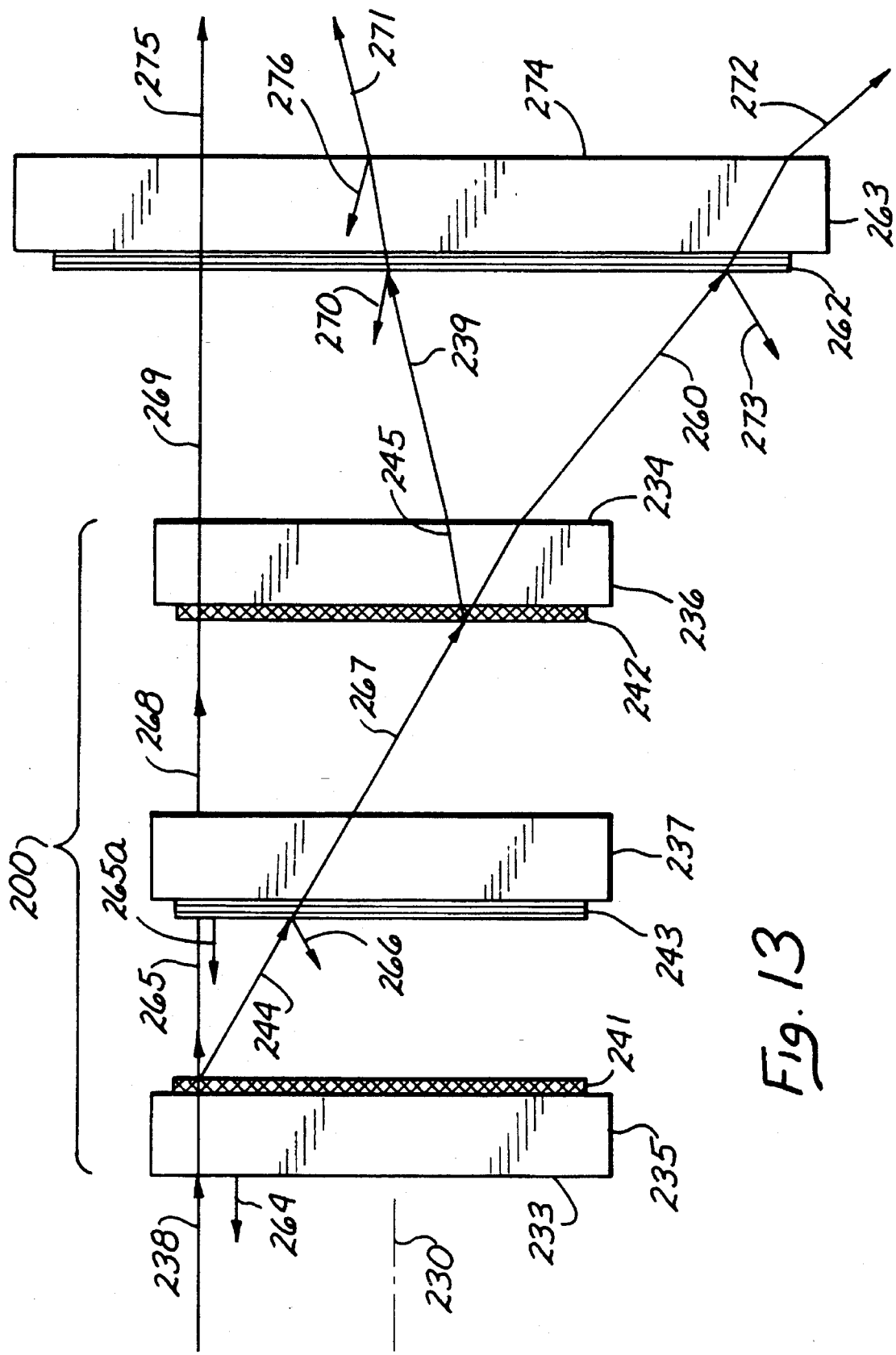
FIG. 13 is a propagation diagram for another holographic optical element that uses a thin film interference filter on the window instead of total internal reflection to achieve the desired suppression.

Of course, various other HOE designs may be employed. For example, the second hologram need not diffract at an opposite internal angle larger than the first hologram's diffraction angle. A design with a lower internal diffraction angle can have advantages of a larger bandwidth and a higher polarization-insensitive efficiency. FIG. 13 shows a HOE 200 that employs a 30 degree internal angle design. It is similar in many respects to the HOE 29 and so only differences are described in further detail. For convenience, reference numerals designating parts of the HOE 200 are increased by one hundred over those designating corresponding parts of the HOE 29.

Thus, the HOE 200 includes first, second, and third substrates 235, 236, and 237. A first hologram 241 on the first substrate 235 is imprinted so that it diffracts a normally incident incoming beam 238 off axis by a first acute angle (30 degrees internal) and in a first radial direction from a rotational axis 230 to a first redirected path depicted at reference numeral 244. A second hologram 242 on the second substrate 236 is imprinted so that it diffracts the beam by a second acute angle (38.186 degrees internal) and in an opposite second radial direction from the rotational axis to a second redirected path depicted at reference numeral 245. The air boundary at the forward surface redirects the beam an additional small amount to a final off-axis angle as depicted at reference numeral 239.

Although the HOE 200 includes a filter element 243 on the third substrate 237 to suppress zero order leakage from the first hologram 241, the 30 degree internal beam in the HOE 200 does not produce total internal reflection, and so zero-order leakage occurs from the second hologram 242 as depicted at reference numeral 260. However, the HOE 200 is incorporated with a thin film filter element 262 on a glass window 263 just ahead of the HOE 200. The filter element 262 suppresses the zero-order leakage from the second hologram without significantly affecting transmittance of the beam 239. alternatively, the filter element 262 may be placed on the front surface 234 of the HOE 200. In either case, filter element 262 may be a computer-optimized, wide-band, short-wavelength-pass, reflector stack the design and fabrication of which is within the capabilities of one of ordinary skill in the art and technology of thin-film dielectric interference filters.

In terms of transmittance and reflectance, the first substrate 235 in FIG. 13 (like the first substrate 135 in FIG. 11) reflects only a small amount of the incoming beam 238 at reference numeral 264 and transmits the rest (as does the first substrate 135 in FIG. 11). It may include an antireflection coating on a rearward surface 233 that exhibits that effect. The design and fabrication of such an antireflection coating may be accomplished by one of ordinary skill in the art and technology of thin-film interference filters. Meanwhile, the first hologram 241 transmits with a high efficiency for both polarizations at 244 (with some zero-order leakage at 265).

The filter dement 243 reflects a little of the first order beam at 30 degrees internal at reference numeral 266 while transmitting most of the first order beam at 30 degrees internal at reference numeral 267. It reflects most of the zero order beam at reference numeral 265A while transmitting only a very little of the incoming beam 238 at reference numerals 268 which continues at 269 and 275.

The second hologram 242 diffracts most of beam 267 into beam 245, which in turn is refracted into beam 239. Any zero-order leakage from the second hologram 242 continues at 260. The second substrate 236 may also include an antireflection coating that transmits most of the beam 239 at the scan angle of 12.5 degrees in air.

The filter element 262 transmits most of the beam 239 at 12.5 degrees to produce the scanning beam 271, while reflecting only a very little at reference numeral 270. It transmits only a very little of the beam 260 at reference numeral 272 while reflecting most of the beam 260 at about 50 degrees internal at reference numeral 273. The window 263 may include an antireflection coating on a forward surface 274 that transmits most of the scanning beam 271 while reflecting very little of the signal beam at reference numeral 276. In other words, the HOE 200 and filter element 262 can combine to maintain one-way residual zero-order leakages (beams 272 and 275) at typically less than about 0.07% ($7 \times 10^{-4}$).

Alternatively, the filter element 243 in FIG. 13 may take the form of a third, transmitting hologram that provides a filtering effect by diffracting the zero-order beam 265 into a high but opposite angle relative to the beam 267. The filter 262 then suppresses it (i.e., reflects it). In that case, the third hologram may be substantially identical to the first hologram 241, but rotated about 180 degrees about the axis 230. The third hologram passes most of the intended first order beam 244 from the first hologram 241 into the beam 267.

Thus, the HOE directs a normally incident on-axis beam to a small off-axis angle. It uses a two-step approach in redirecting the incoming beam while including filter suppression of stray light. The two holograms are conveniently producible with current technology. They may be combine with currently available interference filters for less zero-order leakage, less scatter, and less absorption loss. A master hologram for each hologram employed can be either a computer generated hologram or an optically generated hologram. Any additional holograms can be copied by contact printing. Moreover, the holograms provide substantial saving in weight, volume, and cost over conventional optics.

SYSTEM SOFTWARE

Figure 14:
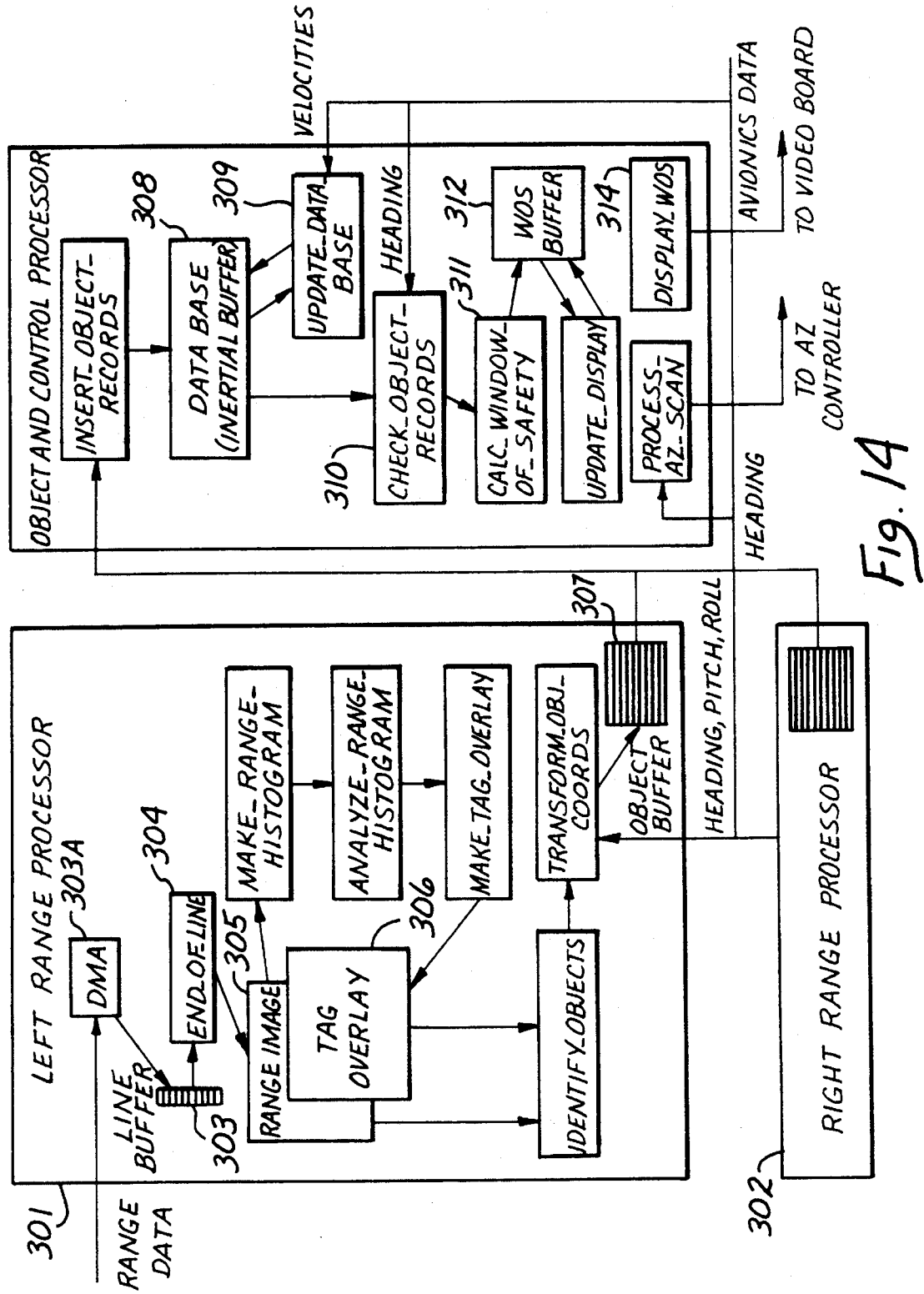
FIGS. 14 and 15 are block diagrams illustrating various aspects of the software.

Microfiche Appendix. The following description reflects the programming contained in the microfiche appendix referred to above. Pages 4–136 of the microfiche appendix include a Program Design Language (PDL) listing for the Object and Control Processor and pages 137–218 include a PDL listing for the Range Processor. The PDL (or Pseudo-Code) follows the syntax of the Aria Computer Language, and one of ordinary skill in the art of computer programming can convert the PDL listings into compilable Ada code or into computer code written in other high-level computer languages. FIG. 14 depicts the data flow in the software.

Input Data. The processor circuitry 24 (FIG. 3) receives data from the ladar control circuitry 21 in the form of a serial data stream with a mean data rate of 64,000 data words per second. It also receives from the scanner controller 27 elevation data relating to the first scanner 22 and azimuth data relating to the second scanner 23. The relationship between the received range data and the position of the HOE 29 is established by two pulses which indicate that the HOE 29 is in the top or bottom position of the scan. The azimuth data is received via a separate serial data channel twice per revolution of the scanning element and shortly after the pulses indicating the top and bottom of the scan.

Viewed from the cockpit of the aircraft (i.e., from the pilot's point of view) the HOE 29 rotates clockwise. As indicated in FIG. 2, each revolution results in a left elevational scan E and a right elevational scan H. Because of processor throughput limitations in the illustrated OASYS, two processors are used to process the range data. A first or left range processor (RP) portion of the processor circuitry 24 processes the range data from the left elevational scan E and a second or right range processor portion of the processor circuitry 24 processes the range data from the right elevational scan H. Those are the range processors identified as left range processor 301 and right range processor 302 in FIGS. 14 and 15. Based upon the foregoing and subsequent descriptions, one of ordinary skill in the art can perform the processing for both the elevational scans in a single processor having sufficiently high throughput.

Both the left and right range processors 301 and 302 use identical software with a flag indicating whether the software is executing on the left or right range processor. One of the differences in processing is that for the left range processor, the pulse at the bottom of the scan indicates the beginning of the elevational scan while for the right range processor it indicates the end of the scan. Conversely, the pulse at the top of the scan indicates the end of the elevational scan for the left range processor and the beginning of the scan for the right range processor. The software subprograms TOP_OF_SCAN and BOT_OF_SCAN on pages 196 and 197 of the microfiche appendix control the program flow accordingly by transferring control to the subprograms START_OF_LINE on page 200 and END_OF_LINE on page 203 of the microfiche appendix, respectively.

The incoming range data is placed into a line buffer 303 in FIG. 14 by a Direct Memory Access (DMA) controller 303A. The DMA controller 030A is initialized by the subprogram SET_UP_DMA (page 202) which is called by line 16 of START_OF_LIE. START_OF_LINE also reads and processes the received azimuth data in lines 38 through 42 and saves such data for later use.

The subprogram END_OF_LINE, shown at numeral 304 in FIG. 14, takes into consideration the difference of scan directions for the left and right elevational scan (lines 66 through 74). It then loops (line 77 through 123) to process all range data in the line buffer. For each range data word, the range data is separated from position information (lines 80 through 84) and the position information is checked (lines 93 through 98). The range data is also checked and corrected for incorrect values (lines 101 through 106). Then, the range data is placed into a range image array 305 in FIG. 14 (line 109). The range image array at any time holds 14 scan lines; when additional scan lines are received older lines are overwritten. During the transfer, the left range processor 301 reverses the sequence of the range image data so that the range image data has the same orientation for both left and fight range processors 301 and 302.

Object Identification. Whenever four new scan lines have been received by a range processor (every 36 milliseconds), a new processing cycle begins. An analysis window is moved over the range image array in the direction from sky to ground. The 47 positions of the analysis window establish an analysis strip. The movement of the analysis window is effected by PROCESS_RANGE_DATA on page 173 of the microfiche appendix. That subprogram executes two loops to perform a first processing pass (lines 28 through 33) and a second processing pass (lines 42 through 44).

For each window position, the data points inside the window are subjected to a statistical analysis. In the first pass, data points which form clusters within a certain range interval are tentatively identified as belonging to either a wire-shaped or a bulky object. That function is performed by the subprograms MAKE_RANGE_HISTOGRAM on page 180 of the microfiche appendix, ANALYZE_RANGE_HISTOGRAM on page 181, and MAKE_TAG_OVERLAY on page 183. The result of that processing is the tag overlay array 306 in FIG. 14. It indicates the tentative identification for each range data element in the range image array 305.

In a second pass, which is performed over the adjacent analysis strip, exactly one object is identified for each position of the analysis window. If more than one object is found within a window, the closest object is identified. That function is performed by the subprogram IDENTIFY_OBJECTS on page 185 of the microfiche appendix. It uses data from the range image array 305 and the tag overlay array 306. It loops over the samples (lines 58 through 83) and lines (lines 60 through 81) of the analysis window and separately counts the range returns tentatively identified as being from wire-shaped or bulky objects and it sums up the range values (lines 62 through 75). If the count for returns from wire-like objects exceeds a threshold, the presence of such an object is presumes and the mean range is calculated (lines 86 and 87). If no wire-like object is found and if the count from bulky objects exceeds a different threshold, the presence of such an object is presumed and the mean range is calculated (lines 94 and 95).

A vernier for the azimuth and the elevation of the object centroid is then calculated which identifies the centroid position within the window. If the object is bulky, this centroid is calculated for its upper margin. If bulky objects are found in successive window positions, they are reported only if they are spaced more than 35 meters apart. This serves the purpose of reducing objects from ground returns.

The process of object identification results in a substantial reduction of the amount of data that must be processed from there on. When the subprogram IDENTIFY_OBJECTS detects the presence of a wire-like or bulky object (line 92 or 102), it transfers control to the subprogram TRANSFORM_OBJECT_COORDS on page 188 of the microfiche appendix. It also passes as parameters the type of the object, its range, the position of the window in which the object was found, and the azimuth and elevation vernier.

For each scan sweep (e.g., left to right) the software receives 47,520 range values. The two range processors 301 and 302 for each scan examine 1927 window positions and, therefore, report at most the same number of objects. This by itself corresponds to a data reduction factor of about twenty-five. In operation, there are often many window positions which do not contain any object. This results in a further reduction of the amount of data to process.

Coordinate Correction and Coordinate Transformation. The coordinates of an identified object are first specified by the following parameters: (1) Azimuth for the analysis strip in which the object was found, (2) the position of the top-left picture element in the analysis window in the scan line (this element is used as a reference, and (3) the offset (vernier) of the object centroid from this picture element. The position of the picture element in the scan line identifies its elevation and azimuth relative to the axis of the scanning element 29. With the help of a look-up table for the forty-seven window positions, and using the mean azimuth for the analysis strip, these object parameters are first transformed into a spherical polar coordinate system whose axis corresponds to the aircraft roll axis.

The lookup-table is calculated in INIT_PROCESS_VARIABLES (lines 61 through 70) on page 171 of the microfiche appendix. In that table, as in many of the angle transformation operations, the sine and cosine of the angles are used rather than the angles in order to avoid repeated conversions. The conversion into spherical coordinates takes place in the subprogram TRANSFORM_OBJ_COORS (line 26 through 52) on page 188 of the microfiche appendix. At that point, offsets between the first scan axis 15 of the turret assembly 11 and the aircraft roll axis (the longitudinal axis of the aircraft) are also taken into consideration.

Next, the object coordinates are transformed from the polar to a cartesian, north-oriented system (inertial coordinate system). The conversion takes several successive steps. First, the coordinates of the spherical polar system are transformed into coordinates of a cartesian coordinate system which is lined up with the polar system (lines 44 through 57). Then, the coordinate system is rotated until it is horizontal and north-oriented.

That involves four rotational steps. The first rotational step is around the pitch axis of the aircraft to compensate for installation offsets (lines 60 through 62). The second is around the roll axis of the aircraft to compensate for aircraft roll (lines 65 through 67). The third is around the pitch axis again to compensate for aircraft pitch (lines 70 through 72), and finally the fourth is around the jaw (heading) axis of the aircraft to compensate for the heading of the aircraft (lines 75 through 77). Object coordinates in the inertial space are counted positive in the directions North, East, and Up, relative to the aircraft.

To perform the transformations, the instantaneous aircraft attitude (heading, roll, and pitch) is required. That instrumentation information is obtained from the aircraft avionics systems by monitoring the 1553B bus. When an update of the avionics data is detected, the data received are time-stamped. The attitude for the time at which returns from an object were received is determined by linear interpolation or extrapolation from two successive received data values. The time stamping is performed by the subprogram PROCESS_ATT_UPDATE on page 199 of the microfiche appendix. It is called from the subprograms TOP_OF_SCAN and BOT_OF_SCAN. The interpolation operation is performed by the subprogram ESTIMATE_ATTITUDE on page 176 of the microfiche appendix. That subprogram is called before the beginning of the second processing pass.

Object Data Base. At this point, the two range processors hand over the object data to the Object and Control Processor (OCP). They do this by placing the object data records into a circular buffer in dual-port memory which is accessible by the OCP (Object Buffer 307 in FIG. 14). The processing cycle of the OCP is determined by the refresh ram of the video display that it generates. The chosen rate of 15 per second (every other video frame) is a compromise between acceptable display flicker and processor throughput required. The various operations that the OCP must perform to process the range data and construct and display the final video image are controlled by the subprogram OCP_ACTIVE on page 47 of the microfiche appendix.

At the beginning of each processing cycle, the OCP reads the data for objects identified by the RPs during the previous cycle from the dual-port memory and places them into an object data base (inertial buffer 308 in FIG. 14). That operation is performed by the subprogram INSERT_OBJECT_RECORDS on page 53 of the microfiche appendix. This object data base is a circular buffer which can hold data for up to 16,384 (16×1024) objects. A second circular buffer contains indices to the object data base for 450 (15×30) OCP processing cycles. The data retained in the data base, therefore, correspond to data from 30 seconds of operation of 16,384 objects, whichever is smaller.

Data Base Update. When an object is placed into the object Data Base, its coordinates reflect its position relative to the aircraft at the time it was identified. The aircraft moves relative to the ground, however, and the data base becomes obsolete unless it is updated regularly. The update takes place at the beginning of each OCP processing cycle. The update is performed by the subprogram UPDATE_DATA_BASE on page 56 of the microfiche appendix (at block 309 in FIG. 14). It subtracts from each of the three coordinates the distance increment that the aircraft has moved in the direction of the coordinate axis since the last update. These increments are calculated from the three velocity vectors. Like the attitude angles, the velocity vectors are obtained from the avionics system by monitoring the 1553B bus traffic. When a velocity update is detected, the three vectors are time stamped and stored. That operation is performed by the subprogram PROC_LONG_INPTS (lines 70 through 75) on page 98 of the microfiche appendix. The velocities at the time the data base update takes place are obtained by linear extrapolation of two previous values. The calculation is performed by PROCESS_AIRFRAME_DATA (lines 61 and 73 through 78) on page 50 of the microfiche appendix.

Objects identified by the RPs during one ladar scan are likely to be identified again during following scans. For this reason, the data base at any time will contain multiple representations of the same objects. If the coordinate transformations and data base updates are performed correctly, all representations of the same object will show identical coordinate values. Small errors in successive updates eventually causes an increasing spread of multiple object representations. This is one of the reasons why the retention time for objects in the data base has been limited.

Visible and Invisible Objects in the Object Data Base. The field of view represented in the OASYS display is 40.5 degrees azimuth by 30 degrees elevation. This FOV is similar to the field scanned by the ladar: 50 degrees azimuth by 25 degrees elevation. As the aircraft flies forward, objects at the horizontal periphery of the display may move out of view. At any time the data base will contain a varying number of such objects. If the heading of the aircraft changes, however, objects that were invisible can become visible again.

The first step in preparing the OASYS display, therefore, is to examine the objects in the data base to determine whether they are within the azimuth range displayed. That check is performed in line 107 of the subprogram CHECK_OBJECT_RECORDS on page 57 of the microfiche appendix (at block 310 in FIG. 14). Objects that meet that requirement are then checked to determine whether they are within a range of 7 to 600 meters on line 112 of CHECK_OBJECT_RECORDS. Although the active range of the ladar is 50 to 600 meters, an object placed into the data base can be displayed at ranges below the 50 meter lower range limit. Only objects which meet both requirements are subjected to further processing by calling CALC_WINDOW_OF_SAFETY (line 123) and passing to that subprogram parameters describing the position of the object relative to the aircraft.

So, the processing time per object depends on whether it is visible or not. Objects in the data base are examined beginning with the ones identified most recently and working backwards. That is done by the subprogram CHECK_OBJECT_RECORDS in the loop beginning in line 66 and ending in line 132. That loop is executed once for each object to be processed. The index to the object data base is set to the last object detected in line 65. It is decremented and, if it reaches the start of the buffer, wrapped around to the end of the buffer, in lines 127 through 131. The number of objects that can be processed within the available time varies, depending on the percentage that are visible. For this reason, the number of objects processed is adjusted dynamically to utilize 80 percent of the OCP cycle (1/15 second). The adjustment is performed by the subprogram OCP_ACTIVE on page 47 of the microfiche appendix. After a given number of objects have been processed and a video buffer has been filled, a subprogram reads the time (line 115) and waits until the video buffer is being displayed (by calling the video driver GCC_SYNC). It then reads the time again and calculates how long it had been waiting (line 118). If the waiting time was less than the desired margin, it decreases the number of objects that are processed in the next cycle (line 120). If the waiting time was longer, it increases the number of objects.

Window of Safety: Concept. The intent of the OASYS display is to help the pilot plan flight maneuvers in order to avoid objects. Obstacles in the flight path can basically be avoided by two evasive maneuvers: flying around the obstacle or pulling up and flying over it. In either case, the maneuver must be started early enough to permit clearing the obstacle in a safe distance.

The OASYS display presents the objects in the form of a silhouette-like outline of the highest obstacles. This display lacks range information, however, and a tall object far away appears the same as a much smaller object at closer distance. for this reason, it would be impossible to use such a display along to navigate the aircraft and perform evasive maneuvers. To overcome this limitation, the OASYS implements a Window of Safety (WOS) concept. In order to permit the pilot to judge when to begin an evasive maneuver, the WOS display represents the relative threat of objects to the aircraft. For this purpose, the height and width of the objects displayed are manipulated.

In the example above, the smaller object at a closer distance represents a larger threat than a taller object that is further away because there is less time for the pilot to take evasive action. The WOS display takes this into account by making objects that are further away appear smaller than the closer ones. As the aircraft approaches the objects, however, their apparent size increases. Similarly, a clearing between two objects can be utilized only if it is wide enough to permit safe clearance of the aircraft rotor. The outlines of objects in the flight path are therefore manipulated to make them appear wider. The flight direction is indicated by a marker. In order to stay clear of objects, the pilot must keep this marker in the Window of Safety, either by changing the heading of the aircraft or by pulling up. Window of Safety: Implementation. The construction of the window of safety display has been implemented in CALC_WINDOW_OF_ SAFETY on page 61 of the microfiche appendix (at block 311 in FIG. 14). The azimuth field of the display window (40.5 degrees) is divided into 27 strips, each 1.5 degrees wide, in order to reduce the processing effort. Each display strip is represented by an element of the WOS buffer array 312 in FIG. 14. The azimuth of objects, relative to the aircraft heading, is first quantitized and converted to an index to the WOS buffer array 312 (line 25) thus assigning each object to a display strip. In order to represent the relative threat of an object if the pilot uses a pull-up maneuver, the subprogram then adds up to three terms (which may be negative) to the object elevation. The first term is always added, independent from the forward speed of the aircraft. The second and third terms reflect the dynamic flight characteristics of the aircraft and are only added when the forward velocity of the aircraft exceeds a given threshold and the aircraft is not hovering.

1. The Clearance Elevation (always positive) is the minimum distance by which the object will be cleared. This term, which may range from 0 to 95 feet (0 to 28.96 meters), or greater, can be entered by the pilot from the control panel. This term is added in line 31 of the subprogram.
2. The Climb Term (positive or negative) represents the change in aircraft elevation by the time an object is reached. This term is predicted from the current horizontal and heading velocities. If the aircraft is climbing, an object will appear smaller; If it is descending, it will appear taller. For level flight, the term is zero. The negative value of this term is added in line 34 of the subprogram.
3. The Acceleration Term (always negative) represents the ability of the aircraft to clear objects by a climb maneuver. To execute such a maneuver successfully, the pilot must start it early enough and must pull up with a vertical acceleration high enough to clear the object. Calculation of the acceleration term requires four parameters: range, heading velocity, vertical acceleration, and pilot reaction time. The heading velocity is a parameter that is available from the aircraft avionics. The latter two parameters are combined in a response term which can be selected by the pilot (in four steps) from the control panel. The value of the acceleration term is calculated in lines 36 through 40 of the subprogram and its negative value is added in line 41.

After the object elevation has been converted into the threat elevation, it is compared with that of other objects previously found in the display strip. If the new object's threat elevation is higher, it replaces the previous value. That operation is performed by the subprogram INCR_HORIZ_ CLEARANCE on page 63 of the microfiche appendix. If the pilot changes the heading of the aircraft in order to fly around an object a safe horizontal clearance must be assured. The OASYS software assures this by predicting the flight path from the current aircraft heading and checking for objects within a "fly-by safety zone" on both sides of the flight path. Objects found in this zone are made to appear wider to provide for safe clearance for the helicopter rotor.

Figure 15:
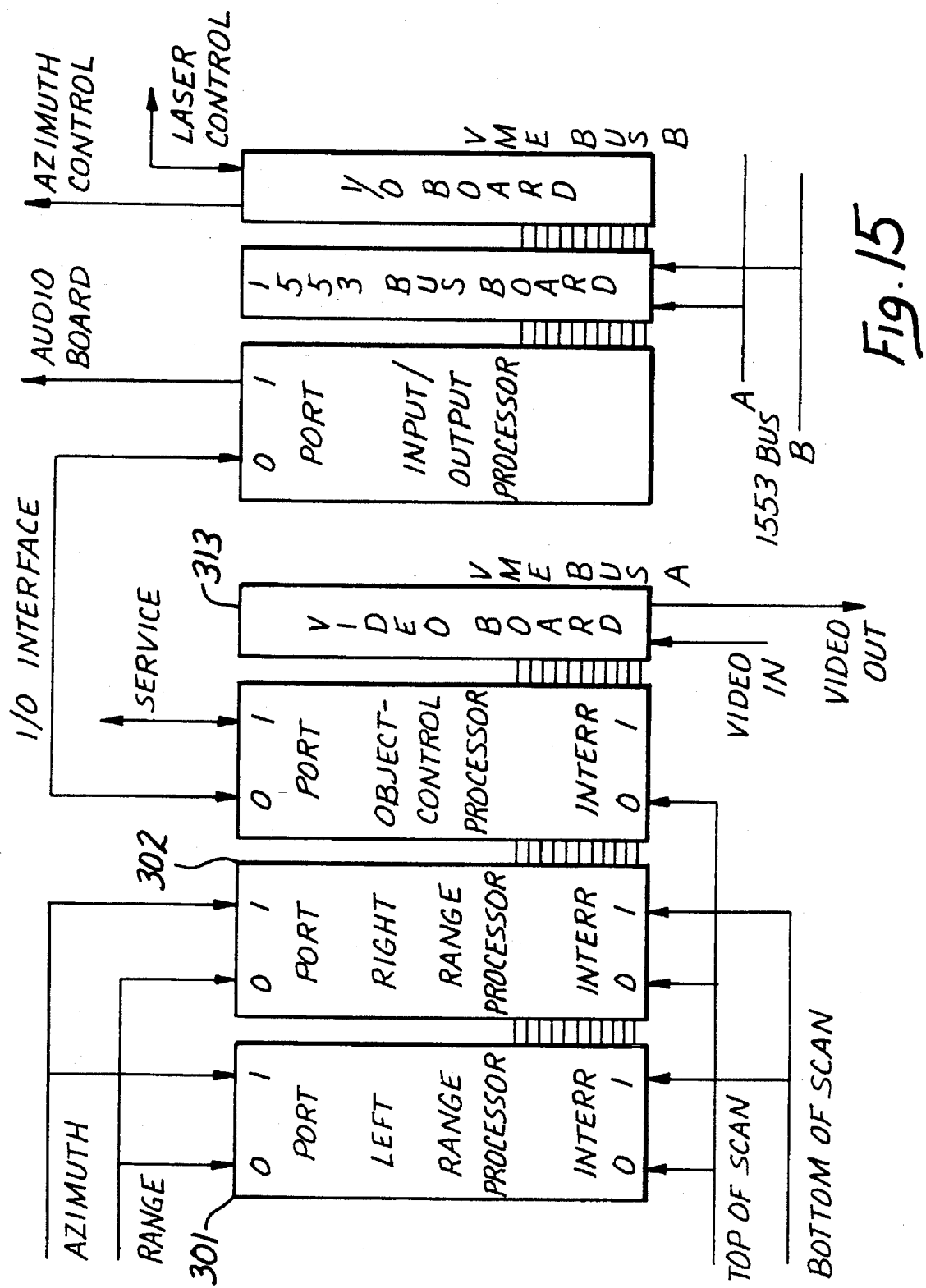

The actual display of the window of safety is performed using a graphics controller card (GCC) or video board 313 in FIG. 15. Cards of this kind are well within the current state of the art and are commercially available from various sources. GCCs have a video output connection which provides a video signal in one of the video standards. They also may have an input connection for a video signal representing a video image.

GCCs are connected to the processor via a computer bus and are addressed as a number of memory locations into which are mapped the picture elements or pixels that make up the video display. By writing suitably composed data words to the GCC addresses, selected pixels in the video display are turned on or off, thus creating graphics patterns on the display. The graphics patterns are either superimposed on video images which are represented by video signals connected to the input of the GCC, or they are presented by themselves without other video images.

The conversion of the object data represented by the threat elevation in the WOS buffer into data suitable for driving the GCC is performed by the subprogram DISPLAY_WOS on page 111 of the microfiche appendix (at block 314 in FIG. 14). That subprogram loops through the 27 elements of the WOS buffer which represent the display strips in the center of the display (line 56 through 85). The threat elevation for each of these display strips is normalized and scaled to represent the Y-coordinate of a pixel in the video display and is then placed into the corresponding element of the array WOS (not shown in FIG. 15) which has been initialized with suitable X-coordinates.

A pointer to the array is then passed as a parameter to the driver subprogram COPY_DATA_TO_GCC (line 88). Driver implementation is well within the capabilities of one of ordinary skill in the art and a PDL listing for one is not shown in the microfiche appendix. After passing the pointer, a driver DRAW_POLYLINE is called (line 89) which causes the GCC to display the video image of the window of safety.

The acoustical warning may be generated in any of various known ways familiar to one of ordinary skill in the electronic art. One method is the use of a speech synthesizer circuit which vocalizes programmed short phrases. Another method is the use of an audio signal generator which produces warning signals with varying pitch. Whatever the device it is triggered by electrical signals or data words into producing the desired acoustical warnings.

The generation of such electrical signals is effected by the subprogram AUDIO_WARNING on page 67 of the microfiche appendix and by the subprogram HOVER_MODE_ WARNING on page 66. The subprogram HOVER MODE WARNING is called from CHECK_OBJECT_RECORDS on page 57 when the forward velocity of the aircraft is below a given limit (hover mode, checked in line 87), if an object is found to be closer than a given limit, and if the object is at or above the flight horizon (line 89). The subprogram HOVER_MODE_WARNING analyzes the heading of the object relative to the aircraft heading and initiates a control signal for the acoustical warning device that indicates the direction of the threat.

If the forward velocity of the aircraft is above a given limit (i.e., it is not hovering), the subprogram OCP_ACTIVE on page 47 of the microfiche appendix calls the subprogram AUDIO_WARNING (line 109) and passes it a pointer to the WOS buffer. AUDIO_WARNING examines the data in the array elements of WOS buffer which represent the seven display strips in the center of the display and determines the largest threat elevation. If that threat elevation exceeds a given threshold, it initiates a control signal for the acoustical warning device.

In other words, the processor circuitry 24 is programmed to (1) overlay video information on existing aircraft video display system, (2) provide acoustical warnings on an aircraft intercom, (3) analyze returns by subdividing the field of regard into a series of analysis windows, performing a statistical analysis of the returns related to each of the analysis windows, and identifying returns that fall into a common range interval, (4) transforming coordinates of objects measured relative to the aircraft to a horizon-stabilized, north-oriented coordinate system which is independent of the attitude of the aircraft, (5) inserting the coordinates of identified objects into a data base so that the coordinates may be used for constructing a video display at a later time and updating the data base to correct for movements of the aircraft, and (6) constructing a display of objects currently within the field of regard by adjusting the displayed position of the objects to compensate for avoidance maneuvers the pilot may execute.

Figure 17:
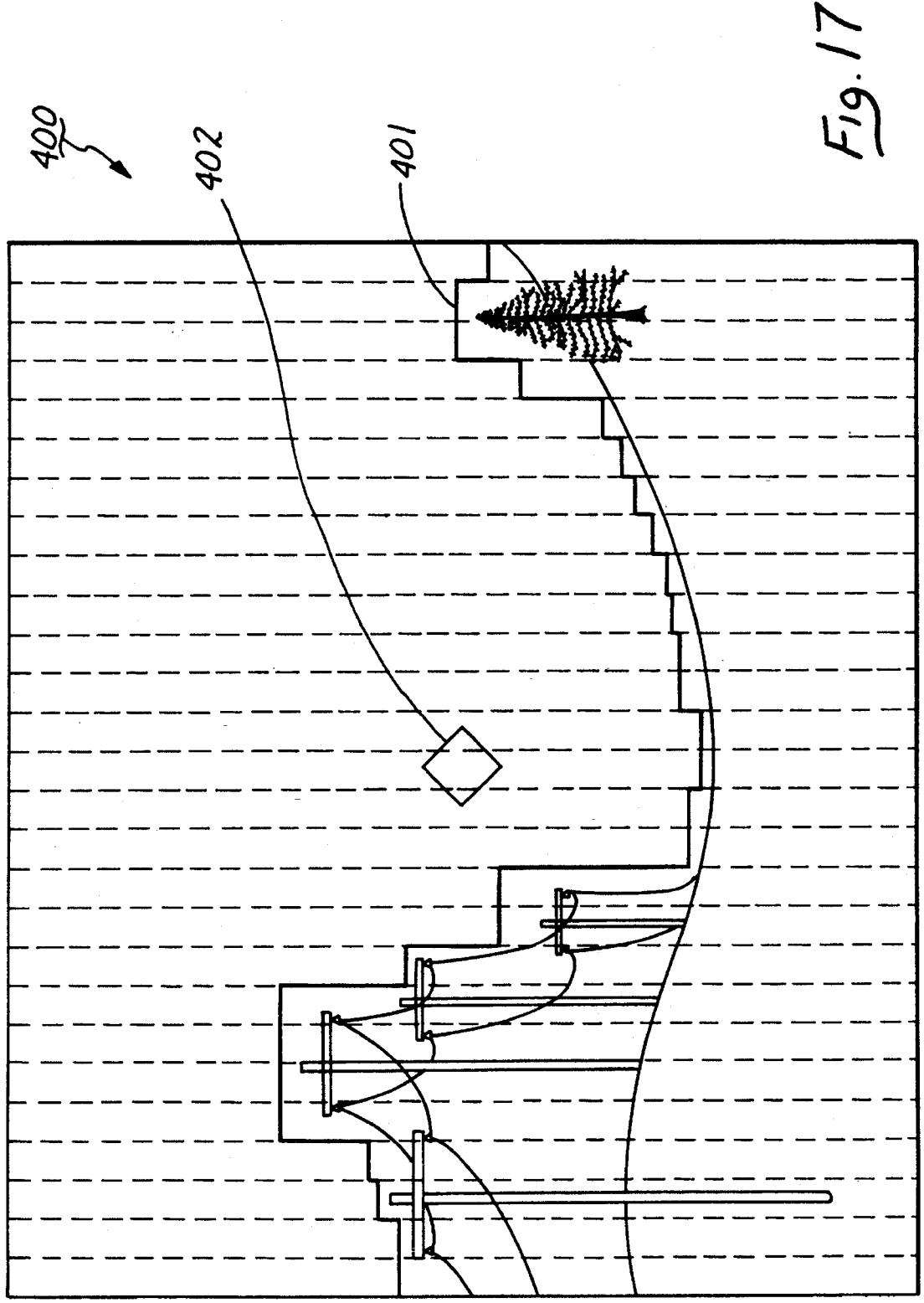
FIGS. 17 and 18 are diagrammatic representations of a scene and the manner in which it is represented by a window-of-safety aspect of the invention.

FIG. 17 illustrates a WOS display 400 relative to a typical scene it represents. It includes a line 401 that represents an outline of objects in the flight path. The diamond figure or cursor 402 represents the position of the helicopter within the window of safety. It shows the heading of the helicopter relative to the line 401 and thereby objects of concern, such as the illustrated line of power line poles on terrain of varying elevation, power lines strung between the poles, and a tree to the fight.

The WOS represents those objects on the helicopter display with the line 401 (a series of line segments) which extends from left to right across the display at a height just over the highest point of the objects. That way, the line 401 divides the screen into an upper portion and a lower portion. The pilot maintains the position indicator above the line 401 (i.e., in the upper portion) to avoid the objects the line 401 represents. In other words, the scene is not displayed. Just the line 401 is displayed.

As previously described, the software manipulates data representing object size so that nearby objects seem larger. It exaggerates their size. It does that as it analyzes the scene in twenty-seven analysis strips represented in FIG. 17 by the dashed lines. The dashed lines are not displayed. They just indicate the analysis strips for purposes of this description.

Exaggerating object size that way results in the line 401 appearing closer to the heading indicator for nearby objects even though the object may be much smaller than distant objects. That alerts the pilot to commence evasive maneuvers sooner in order to avoid the nearby objects. As long as the pilot keeps the heading indicator above the line 401 (i.e., in the upper portion), the helicopter is still able to maneuver above or around the objects the line 401 represents.

The line 401 provides a step display. In other words, it extends horizontally across each analysis strip at a specified height above the object in that analysis strip. The specified height may be dialed in by the pilot.

Figure 18:
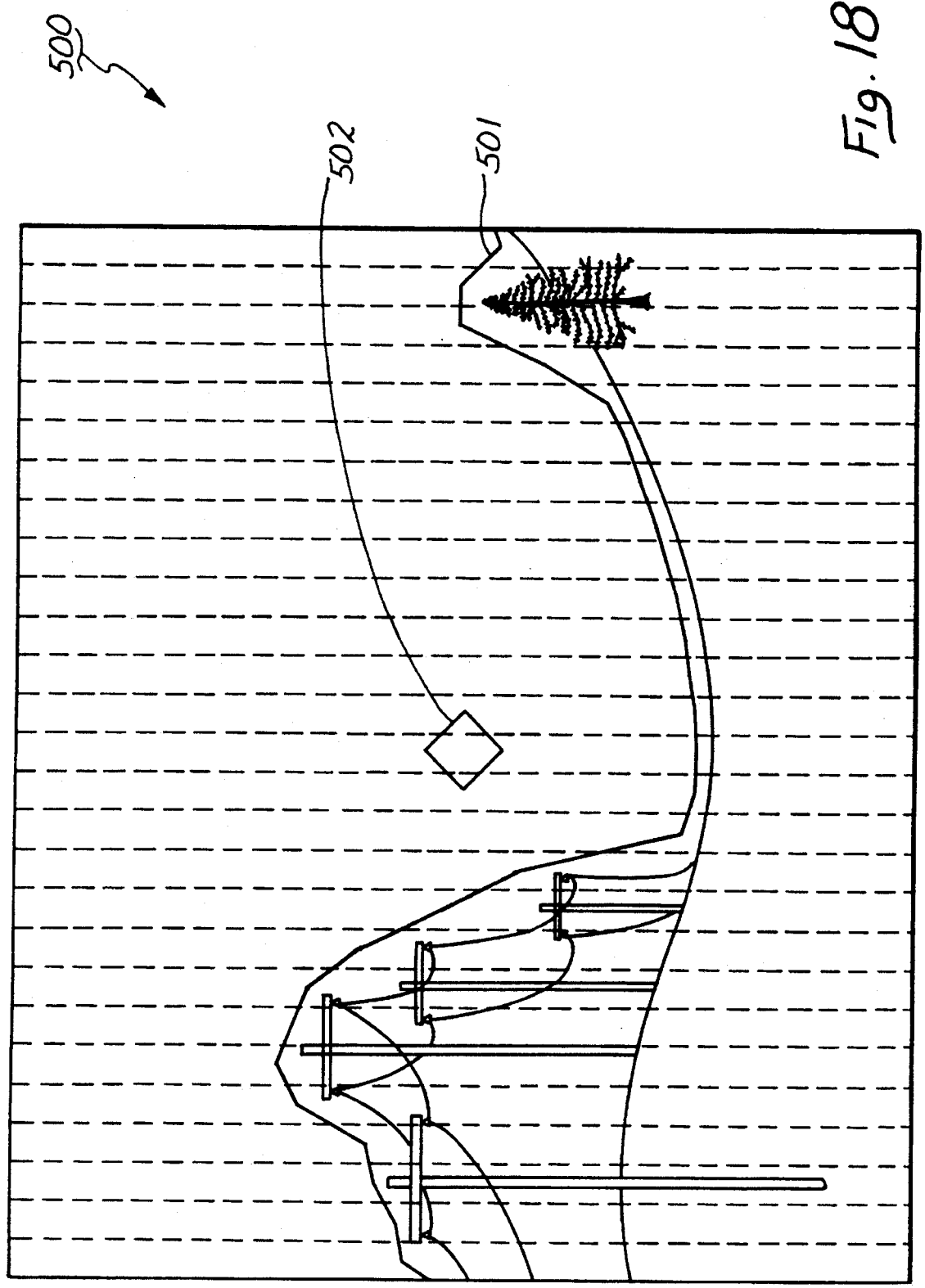

FIG. 18 illustrates a WOS display 500 with a line 501 that provides a line display. The line 501 extends from a point at the center of each analysis strip to points at the centers of the adjacent analysis strips. The point in each analysis strip is at the specified height above the object in that analysis strip.

Thus, the invention provides an onboard, ladar based, obstacle-detecting and pilot-warning system that is small, compact, lightweight, and cost effective. It features eye-safe operation, provides an effective pilot interface, and installs conveniently on existing aircraft. It operates at day or night and under inclement weather conditions, and it does not impair aircraft survivability. Furthermore, it adapts readily to both rotary-wing an fixed-wing aircraft.

Although an exemplary embodiment has been shown and described, one of ordinary skill in the art may make many changes, modifications, and substitutions without necessarily departing from the spirit and scope of the invention. Thus, the specific capabilities of electrical apparatus and other specific quantities are given by way of example, and the required number of element of electrical circuits are given only as example, which may be increased or changed by the requirements of specific systems.

What is claimed is:

1. A system for sensing objects in the flight path of an aircraft and alerting a pilot of the aircraft to their presence, the system comprising:

means in the form of a laser radar subsystem for emitting a beam of laser energy, for receiving returns from objects, and for processing the returns to produce range data related to the range of the objects from the aircraft, the laser radar subsystem being mounted on an aircraft having means in the form of an avionics system for producing instrumentation data concerning the attitude and the velocity vectors of the aircraft and means in the form of a video display system for displaying information to a pilot of the aircraft;

means in the form of a scanning subsystem that is mounted on the aircraft and operatively coupled to the laser radar subsystem for scanning the beam over a field of regard and producing directional information related to the instantaneous direction of the beam relative to the aircraft; and means in the form of processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce video information related to the range and direction of the objects, and for interfacing the video information to the video display system;

the scanning subsystem including means in the form of a first scanner mechanism including means in the form of a rotatably mounted scanning holographic optical element pair for directing the beam off axis together with means for reducing zero order beam bleed-through transmittance so that rotating the optical element produces a circular scan pattern centered on the first scan axis and means in the form of a second scanner mechanism for moving the first scan axis azimuthally in a repetitive motion so that the circular scan pattern covers the field of regard.

2. A system as recited in claim 1, wherein the means for reducing zero-order beam bleed-through transmittance includes at least one of a thin-film interference layer, a transmittance holographic element, and a reflectance holographic element.

3. A system as recited in claim 1 wherein the scanning subsystem includes a platform structure on which the first scanner mechanism is mounted, and the laser radar subsystem and the processor circuitry are also mounted on the platform structure.

4. A system as recited in claim 1, wherein the processor circuitry is programmed to overlay the video information on other video information displayed by the video display system.

5. A system as recited in claim 1, wherein the processor circuitry is programmed to provide acoustical warnings on an aircraft intercom system.

6. A system as recited in claim 1 wherein the processor circuitry is programmed to analyze returns by:

subdividing the field of regard into a series of analysis windows;

relating each of the returns to a particular one of the analysis windows from which the return came;

performing a statistical analysis of the returns related to each of the analysis windows; and identifying returns that fall into a common range interval.

7. A system as recited in claim 1, wherein the processor circuitry is programmed to transform coordinates of objects measured relative to the aircraft to a horizon-stabilized, north-oriented coordinate system which is independent of the attitude of the aircraft.

8. A system as recited in claim 1, wherein the processor circuitry is programmed to insert the coordinates of identified objects into a data base so that the coordinates may be used for constructing a video display at a later time.

9. A system as recited in claim 8, wherein the processor circuitry is programmed to update the data base to correct for movements of the aircraft.

10. A system as recited in claim 1, wherein the processor circuitry is programmed to construct a display of objects currently within the field of regard by adjusting the displayed position of the objects to compensate for avoidance maneuvers the pilot may execute.

11. An obstacle avoidance system for use on an aircraft for sensing objects along the flight path thereof and alerting the pilot to their presence, said aircraft having an avionics system for producing instrumentation data concerning the attitude and the velocity vectors of the aircraft and a video display system for displaying information to the pilot, the system comprising:

a laser radar subsystem for emitting a beam of laser energy pulses, for receiving returns from objects, and for processing the returns to produce data related to existence of objects in the flight path of said aircraft, said laser radar subsystem including analyzing means for identifying wire-shaped objects and for identifying bulky objects from said returns and for calculating the range and direction information of said objects whenever found;

a scanning subsystem mounted on the aircraft and operatively coupled to the laser radar subsystem for scanning the beam over a field of regard and producing directional information related to the instantaneous direction of the beam relative to the aircraft;

said scanning subsystem further including a first scanner for scanning the beam in a circular scan pattern centered on a first scan axis and a second scanner for moving the first scan axis azimuthally in a repetitive motion so that the circular scan pattern covers the field of regard; and processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce a stream of data representing video information related to the range, azimuth and elevation of said objects, and for developing therefrom a line representing the lower limit of safe clearance azimuthal and elevational headings for said aircraft over and around said wire-like objects and bulky objects, means for displaying a heading indicator on said display showing the intercept of the projected path of aircraft travel onto said video display, means for displaying said line on said video display, the area above said line representing a window of safety for the flight of said aircraft which may then be flown to keep the heading indicator above said line and within said window.

12. A system as recited in claim 11, wherein the scanning subsystem includes a platform structure on which the first scanner is mounted, and the laser radar subsystem and the processor circuitry are also mounted on the platform structure.

13. A system as recited in claim 11, wherein the processor circuitry is programmed to provide acoustical warnings on an aircraft intercom system.

14. A system as recited in claim 11, wherein the processor circuitry is programmed to construct a display of objects currently within the field of regard by adjusting the displayed position of the objects to compensate for avoidance maneuvers the pilot may execute.

15. The system as in claim 11 further including means for manipulating the data according to the range of the objects from the aircraft to accentuate the size of objects according to aircraft maneuverability and how close the objects are to the aircraft.

16. The system as in claim 11 further including means for presenting said objects as representational images on said video display wherein the elevation of said images is given as height and azimuth is given as horizontal position so that said display appears as a pilot's view reconstruction of the scene into which the aircraft is being flown.

17. A system as recited in claim 11, wherein the processor circuitry is programmed to overlay the video information on other video information displayed by the video display system.

18. An obstacle avoidance system for use on an aircraft for sensing objects along the flight path thereof and alerting the pilot to their presence, said aircraft having an avionics system for producing instrumentation data concerning the attitude and the velocity vectors of the aircraft and a video display system for displaying information to the pilot, the system comprising:

a laser radar subsystem for emitting a beam of laser energy for receiving returns from objects, and for processing the returns to produce data related to existence of objects in the flight path of said aircraft, said laser radar subsystem including analyzing means for identifying wire-shaped objects and for identifying bulky objects and for calculating the range and direction information of said objects whenever found;

a scanning subsystem that is mounted on the aircraft and operatively coupled to the laser radar subsystem for scanning the beam over a field of regard and producing directional information related to the instantaneous direction of the beam relative to the aircraft;

said scanning subsystem further including a first scanner for scanning the beam in a circular scan pattern centered on a first scan axis and a second scanner for moving the first scan axis azimuthally in a repetitive motion so that the circular scan pattern covers the field of regard; and processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce video information related to the range and direction of said objects, and for interfacing the video information to the video display system for viewing by the pilot said processor circuitry being programmed to analyze returns by:

subdividing the field of regard into a series of analysis windows;

relating each of the returns to a particular one of the analysis windows from which the return came;

performing a statistical analysis of the returns related to each of the analysis windows; and identifying returns that fall into a common range interval.

19. An obstacle avoidance system for use on an aircraft for sensing objects along the flight path thereof and alerting the pilot to their presence, said aircraft having an avionics system for producing instrumentation data concerning the attitude and the velocity vectors of the aircraft and a video display system for displaying information to the pilot, the system comprising:

a laser radar subsystem for emitting a beam of laser energy for receiving returns from objects, and for processing the returns to produce data related to existence of objects in the flight path of said aircraft, said laser radar subsystem including analyzing means for identifying wire-shaped objects and for identifying bulky objects and for calculating the range and direction information of said objects whenever found;

a scanning subsystem that is mounted on the aircraft and operatively coupled to the laser radar subsystem for scanning the beam over a field of regard and producing directional information related to the instantaneous direction of the beam relative to the aircraft;

said scanning subsystem further including a first scanner for scanning the beam in a circular scan pattern centered on a first scan axis and a second scanner for moving the first scan axis azimuthally in a repetitive motion so that the circular scan pattern covers the field of regard; and processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce video information related to the range and direction of said objects, and for interfacing the video information to the video display system for viewing by the pilot said processor circuitry being programmed to transform coordinates of objects measured relative to the aircraft to a horizon-stabilized, north-oriented coordinate system which is independent of the attitude of the aircraft.

20. An obstacle avoidance system for use on an aircraft for sensing objects along the flight path thereof and alerting, the pilot to their presence, said aircraft having an avionics system for producing instrumentation data concerning the attitude and the velocity vectors of the aircraft and a video display system for displaying information to the pilot, the system comprising:

a laser radar subsystem for emitting a beam of laser energy for receiving returns from objects, and for processing the returns to produce data related to existence of objects in the flight path of said aircraft, said laser radar subsystem including analyzing means for identifying wire-shaped objects and for identifying bulky objects and for calculating the range and direction information of said objects whenever found;

a scanning subsystem that is mounted on the aircraft and operatively coupled to the laser radar subsystem for scanning the beam over a field of regard and producing directional information related to the instantaneous direction of the beam relative to the aircraft;

said scanning subsystem further including a first scanner for scanning the beam in a circular scan pattern centered on a first scan axis and a second scanner for moving the first scan axis azimuthally in a repetitive motion so that the circular scan pattern covers the field of regard; and processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce video information related to the range and direction of said objects, and for interfacing the video information to the video display system for viewing by the pilot said processor circuitry being programmed to insert the coordinates of identified objects into a data base so that the coordinates may be used for constructing a video display at a later time.

21. A system as recited in claim 20 wherein the processor circuitry is programmed to update the data base to correct for movements of the aircraft.

22. A system for sensing objects in the flight path of an aircraft and alerting a pilot of the aircraft to their presence, the system comprising:

means in the form of a laser radar subsystem for emitting a beam of laser energy, for receiving returns from objects, and for processing the returns to produce range data related to the range of the objects from the aircraft, the laser radar subsystem being mounted on an aircraft having means in the form of an avionics system for producing instrumentation data concerning the attitude and the velocity vectors of the aircraft and means in the form of a video display system for displaying information to a pilot of the aircraft;

means in the form of a scanning subsystem that is mounted on the aircraft and operatively coupled to the laser radar subsystem for scanning the beam over a field of regard and producing directional information related to the instantaneous direction of the beam relative to the aircraft; and means in the form of processor circuitry operatively connected to the laser radar subsystem, the scanning subsystem, the avionics system, and the video display system, for controlling operation of the laser radar subsystem and the scanning subsystem, for processing the range data, directional information, and instrumentation data in order to produce video information related to the range and direction of the objects, and for interfacing the video information to the video display system;

the processor circuitry being programmed to overlay the video information on other video information displayed by the aircraft video system;

said processor circuitry further being programmed to perform at least one of:

providing acoustical warnings on an aircraft intercom system;

analyzing returns by subdividing the field of regard into a series of analysis windows, relating each of the returns to a particular one of the analysis windows from which the return came, performing a statistical analysis of the returns related to each Of the analysis windows, and identifying returns that fall into a common range interval;

transforming coordinates of objects measured relative to the aircraft to a horizon-stabilized, north-oriented coordinate system which is independent of the attitude of the aircraft;

inserting the coordinates of identified objects into a data base so that the coordinates may be used for constructing a video display at a later time and updating the data base to correct for movements of the aircraft; and constructing a display of objects currently within the field of regard by adjusting the displayed position of the objects to compensate for avoidance maneuvers the pilot may execute.

23. A method of scanning a laser beam over a field of regard, comprising:

providing a scan element in the form of holographic optical element pair together with means for reducing zero order beam bleed-through transmittance therefrom;

directing an on-axis laser beam with said optical element toward a field of regard in an off-axis direction relative to a first scan axis;

spinning the optical element on the first scan axis so that the laser beam produces a circular scan pattern within the field of regard that is centered on the first scan axis; and pivoting the optical element and the first scan axis about a second scan axis that is perpendicular to the first scan axis in order to move the circular scan pattern in a repetitive motion over the field of regard.

24. A method of scanning a laser beam over a field of regard, comprising scanning the beam in a circular scan pattern within the field of regard; and moving the circular scan pattern repetitively over the field of regard, and varying the angular velocity of pivoting the optical element and the first scan axis about a second scan axis that is perpendicular to the first scan axis in response to the turn rate of the aircraft in order to keep the azimuthal scan rate constant with respect to the environment.

25. A method of scanning a laser beam over a field of regard, comprising:

directing an on-axis laser beam with said optical element toward a field of regard in an off-axis direction relative to a first scan axis, while directing the on-axis beam in an intermediate direction with a first hologram on the optical element and then directing the beam in the off-axis direction with a second hologram on the optical element;

spinning the optical element on the first scan axis so that the laser beam produces a circular scan pattern within the field of regard that is centered on the first scan axis; and pivoting the optical element and the first scan axis about a second scan axis that is perpendicular to the first scan axis in order to move the circular scan pattern in a repetitive motion over the field of regard.

26. A method as recited in claim 25, wherein the step of directing an on-axis laser beam with an optical element toward a field of regard in an off-axis direction includes impeding zero order bleed-through.

27. A method of sensing and alerting a pilot to objects in the flight path of an aircraft having an avionics system for producing instrumentation data concerning the attitude and the velocity vectors of the aircraft and a video display system for displaying information to a pilot of the aircraft, the method comprising:

providing means in the form of a laser radar subsystem mounted on the aircraft for emitting a beam toward objects, for receiving returns from the objects, and for processing the returns to produce range data related to the range of the objects;

said processing including analyzing returns by subdividing the field of regard into a series of analysis windows, relating each of the returns to a particular one of the analysis windows from which the return came, performing a statistical analysis of the returns related to each of the analysis windows, and identifying returns that fall into a common range interval, and further analyzing to identify wire-shaped objects and to identify bulky objects and calculating the range and direction information of said objects whenever found;

scanning the beam in a circular scan pattern centered on a first scan axis while moving the first scan axis azimuthally in a repetitive motion so that the circular scan pattern covers a field of regard;

producing directional information related to the instantaneous direction of the beam relative to the aircraft;

processing the range data and the directional information with the instrumentation data to produce video information related to the range and direction of said objects; and interfacing the video information relating to said objects to a video display system on the aircraft.

28. A method for sensing and alerting a pilot to objects in the flight path of an aircraft having an avionics system for producing instrumentation data concerning the attitude and the velocity vectors of the aircraft and a video display system for displaying information to a pilot of the aircraft, the method comprising:

providing means in the form of a laser radar subsystem mounted on the aircraft for emitting a beam toward objects, for receiving returns from the objects, and for processing the returns to produce range data related to the range of the objects;

scanning the beam in a circular scan pattern centered on a first scan axis while moving the first scan axis azimuthally in a repetitive motion so that the circular scan pattern covers a field of regard;

producing directional information related to the instantaneous direction of the beam relative to the aircraft;

processing the range data and the directional information with the instrumentation data to produce video information related to the range and direction of the objects by at least one of the following steps:

providing acoustical warnings on an aircraft intercom system;

analyzing returns by subdividing the field of regard into a series of analysis windows, relating each of the returns to a particular one of the analysis windows from which the return came, performing a statistical analysis of the returns related to each of the analysis windows, and identifying returns that fall into a common range interval;

transforming coordinates of objects measured relative to the aircraft to a horizon-stabilized, north-oriented coordinate system which is independent of the attitude of the aircraft;

inserting the coordinates of identified objects into a data base so that the coordinates may be used for constructing a video display at a later time and updating the data base to correct for movements of the aircraft; and constructing a display of objects currently within the field of regard by adjusting the displayed position of the objects to compensate for avoidance maneuvers the pilot may execute; and thereafter, interfacing the video information to a video display system on the aircraft.

29. In a system for sensing objects along the flight path of an aircraft having a video display system and alerting a pilot of the aircraft to their presence, a method of alerting the pilot, comprising:

detecting objects along the flight path of said aircraft to obtain range data and directional information on said objects to produce data representing the size and position of the objects relative to the aircraft, and updating the data as flight of the aircraft continues;

producing a stream of video data from said object information and data corresponding to the range, azimuth and elevation of said objects, displaying a heading indicator on said display showing the intercept of the path of aircraft travel onto said video display, developing from the stream of data a line representing the lower limit of safe headings over the displayed images and for displaying said line on said video display, the area above said line representing a window of safety for the flight of said aircraft which may then be flown to keep the heading indicator above said line.

30. In an obstacle avoidance system for use on an aircraft for sensing objects along the flight path thereof and alerting the pilot to their presence, said aircraft having an avionics system for producing instrumentation data concerning the attitude and the velocity vectors of the aircraft and a video display for displaying information to the pilot, the method comprising:

emitting a beam of laser energy pulses over a circular scan pattern repetitively moved about a field of regard along the flight path of said aircraft, receiving returns from objects within said field, processing the returns to produce data related to existence of objects on said flight path, analyzing said returns to identify wire-shaped objects bulky objects and calculating the range and direction information of said objects whenever found, producing directional information related to the instantaneous direction of the beam relative to the aircraft, processing the range data, directional information, and instrumentation data in order to produce a stream of data representing the range, azimuth and elevation of said objects, developing from the stream of data a line representing the lower limit of safe clearance headings, displaying a heading indicator on said display showing the intercept of the projected path of aircraft travel onto said video display, displaying said line on said video display, the area above said line representing a window of safety for the flight of said aircraft which may then be flown to keep said heading indicator above said line.

31. The method as in claim 30 further including the step of manipulating the data according to the range of the objects from the aircraft to produce a stream of manipulated data that accentuates the size of objects according to aircraft maneuverability and how close the objects are to the aircraft.

* * * * *